(12) United States Patent
Woodland

(10) Patent No.: US 12,052,268 B2
(45) Date of Patent: Jul. 30, 2024

(54) MAN-IN-THE-MIDDLE EXTENDER DEFENSE IN DATA COMMUNICATIONS

(71) Applicant: Itron, Inc., Liberty Lake, WA (US)

(72) Inventor: Bernard M. Woodland, Cary, NC (US)

(73) Assignee: ITRON, INC., Liberty Lake, WA (US)

( * ) Notice: Subject to any disclaimer, the term of this patent is extended or adjusted under 35 U.S.C. 154(b) by 150 days.

(21) Appl. No.: 16/729,892

(22) Filed: Dec. 30, 2019

(65) Prior Publication Data
US 2021/0203670 A1    Jul. 1, 2021

(51) Int. Cl.
| | |
|---|---|
| H04L 29/06 | (2006.01) |
| G06F 21/44 | (2013.01) |
| H04L 9/08 | (2006.01) |
| H04L 9/40 | (2022.01) |

(52) U.S. Cl.
CPC ............ H04L 63/126 (2013.01); G06F 21/44 (2013.01); H04L 9/088 (2013.01); G06F 2221/2129 (2013.01)

(58) Field of Classification Search
CPC ....... H04L 63/126; H04L 9/088; G06F 21/44; G06F 2221/2129
See application file for complete search history.

(56) References Cited

U.S. PATENT DOCUMENTS

| | | | | |
|---|---|---|---|---|
| 5,396,537 A * | 3/1995 | Schwendeman | ..... | H04M 11/022 |
| | | | | 340/7.29 |
| 7,389,530 B2 * | 6/2008 | Raghunath | ............ | H04L 9/0891 |
| | | | | 726/2 |
| 7,685,422 B2 * | 3/2010 | Isozaki | ................... | H04L 63/08 |
| | | | | 713/168 |
| 9,455,979 B2 * | 9/2016 | Blanke | ..................... | G06F 21/42 |
| 9,544,148 B2 * | 1/2017 | Brown | .............. | H04M 1/72412 |
| 9,561,662 B2 * | 2/2017 | Ward | ..................... | H04L 9/3271 |
| 10,284,553 B2 * | 5/2019 | Morita | ............... | H04L 63/0869 |
| 10,965,455 B2 * | 3/2021 | Park | .................. | H04W 12/0431 |
| 2008/0117076 A1 * | 5/2008 | Klaus | ...................... | G01D 4/006 |
| | | | | 340/502 |

(Continued)

FOREIGN PATENT DOCUMENTS

CN    1906572 B  *  3/2011    ............... G06F 9/30

Primary Examiner — Mahfuzur Rahman
Assistant Examiner — Alex D Carrasquillo
(74) Attorney, Agent, or Firm — Lee & Hayes P.C.

(57) ABSTRACT

A method of determining whether a received message at a communications device is from a legitimate second device may include building a message intended for a legitimate second device, generating a time delay using a secret key known to the device and the legitimate second device, sending the built message to the legitimate second device, starting a timer at the time of sending the built message, receiving a response to the sent message, determining a response time of the received response based on a time value of the timer, determining an acceptable receive window of time based on the generated time delay, determining whether the determined response time is within the determined acceptable receive window of time, and when the determined response time is within the determined acceptable receive window of time, recognizing the received response as a legitimate message from the legitimate second device.

21 Claims, 16 Drawing Sheets

(56) References Cited

U.S. PATENT DOCUMENTS

| | | | | |
|---|---|---|---|---|
| 2012/0063597 A1* | 3/2012 | Tropp | ............... | H04L 9/0866 380/259 |
| 2012/0169510 A1* | 7/2012 | Pamulaparthy | ........ | G01D 4/004 340/870.02 |
| 2012/0206274 A1* | 8/2012 | LaFrance | ............... | G06Q 10/10 340/870.16 |
| 2013/0281060 A1* | 10/2013 | Escott | ............... | H04L 63/0823 455/411 |
| 2013/0293390 A1* | 11/2013 | Le Buhan | ............... | G01D 4/004 340/870.02 |
| 2016/0269168 A1* | 9/2016 | Carstens | ............... | E05B 65/5246 |
| 2017/0236352 A1* | 8/2017 | Conrad | ............... | G01S 19/13 340/5.61 |
| 2018/0351941 A1* | 12/2018 | Chhabra | ............... | H04L 9/3234 |
| 2019/0110196 A1* | 4/2019 | Simileysky | ............... | H04W 4/004 |
| 2019/0147157 A1* | 5/2019 | Moorman | ............... | H04W 4/80 713/171 |
| 2019/0243961 A1* | 8/2019 | Ollivier | ............... | G06F 21/57 |
| 2019/0332297 A1* | 10/2019 | Zhang | ............... | H04L 63/0876 |
| 2020/0177375 A1* | 6/2020 | Buck | ............... | H04L 9/0891 |
| 2020/0201981 A1* | 6/2020 | Wardman | ............... | G06F 21/44 |
| 2021/0150018 A1* | 5/2021 | Paaredi | ............... | G06F 21/44 |
| 2021/0184854 A1* | 6/2021 | Pizot | ............... | H04L 63/0823 |

* cited by examiner

MAN-IN-THE-MIDDLE EXTENDER DEFENSE IN DATA COMMUNICATIONS

FIELD OF THE DISCLOSURE

This disclosure relates generally to authentication of networked communication devices.

BACKGROUND

Currently, there are many examples of using a network device (e.g., a portable network device, such as a mobile phone or other device) to access an operable device (e.g., entrances such as doors/gates/locks of a house, hotel room, car, storage units, or other restricted access locations; household items/appliances such as televisions, stereos/audio systems, refrigerators, thermostats, security systems, lights, cameras, etc.; and many other operable devices). For many of these applications, the network device may need to be authenticated, and the authentication may need to include verifying that the network device is in proximity of the operable device when an attempt is made to access the operable device. This proximity may be checked by utilizing known technologies, such as global positioning or by requiring use of a short-range communication technology such as Bluetooth between the network device and the operable device. However, it may be significantly more expensive, or take up too much space, to include global positioning technology or specific (even multiple) communication capabilities in an operable device (or even in a networked device if it does not already have those capabilities). These technologies may also draw a significant amount of power. In addition, for some of these applications, a clock (e.g., a real-time clock) may be used (e.g., for a door lock or thermostat), which may depend on a battery. A battery weakened by excessive power draw may cause the clock to slow, or even stop. For these reasons, using some of these technologies to authenticate a network device would not be energy efficient, would not be cost-effective, and may limit the usage (and possibly shelf life) of an operable device, especially one dependent upon a battery.

The above-noted applications may also be subject to security risks. One example of a security risk may be due to an inaccurate clock. For implementations that are to allow access to an operable device within a restricted date/time window, an inaccurate clock may cause access to an operable device at an unauthorized time. For example, in the case of a door lock implementation (e.g., a hotel room or rental home), a person may gain access to the room or home when he or she is not authorized to be there. Another example of a security risk is in the length of time it may take to revoke access authorization that was previously granted. A last-minute attempt at access revocation may be too late if an operable device has already been accessed. A third example of a security risk is a man-in-the-middle (MITM) attack, where an unauthorized device may gain access to an operable device by eavesdropping on a message exchange or by impersonating an end device (e.g., the accessing device or operable device) in order to obtain the data needed to access/operate the end device.

For at least these reasons, solutions to authenticate locally in an energy-efficient and cost-efficient way, while minimizing or eliminating associated risks, is needed.

Figure 1:
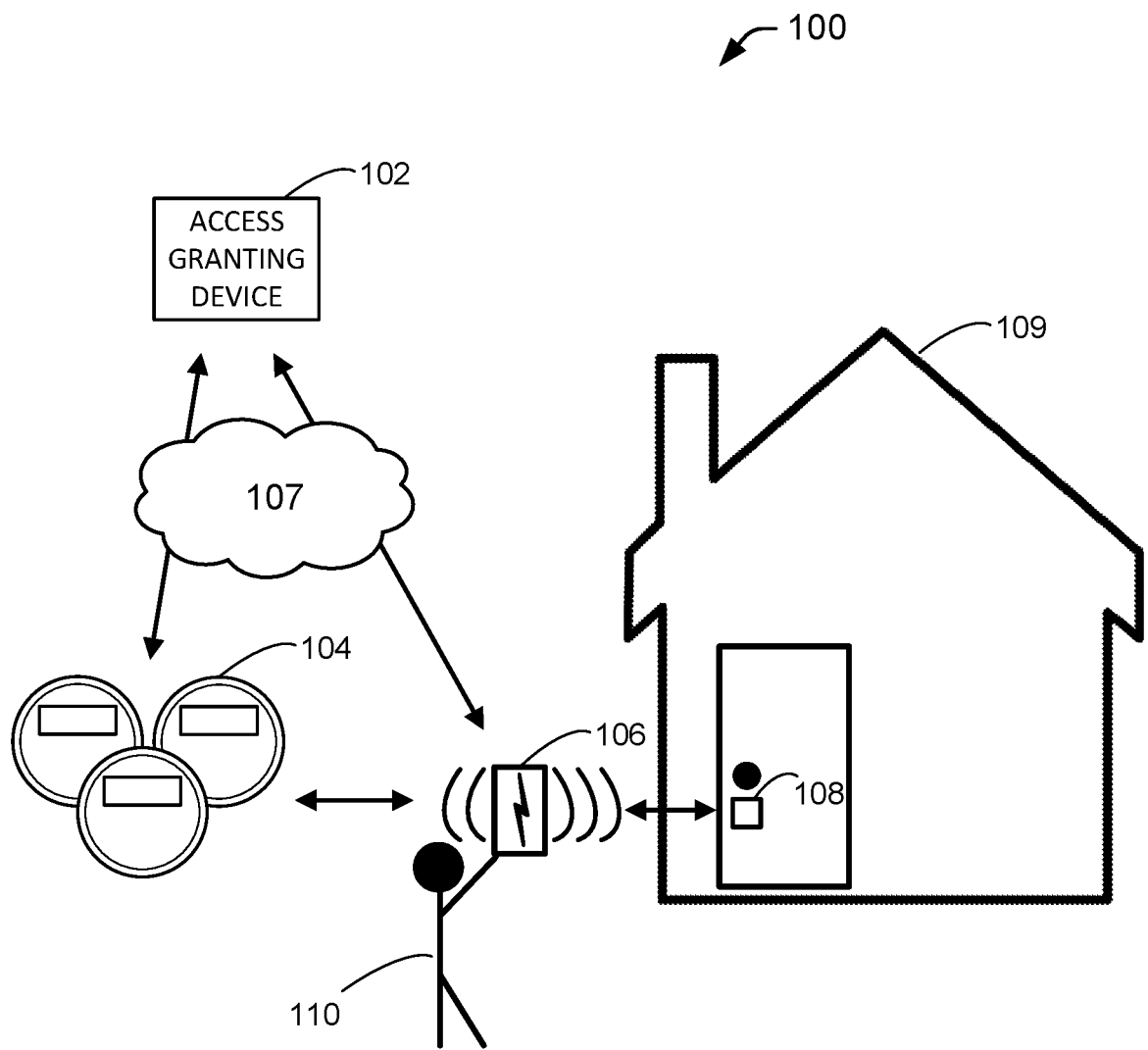
FIG. 1 is an illustration depicting an example environment in which an example accessor device (e.g., a mobile device or other device) may request and gain access to an example operable device, according to an embodiment of the present disclosure.

In the drawings, the leftmost digit(s) of a reference number may identify the drawing in which the reference number first appears.

DETAILED DESCRIPTION

The description herein discloses techniques and solutions that may be used to locally authenticate a communications device while saving time and resources, and while also minimizing potential security issues. These solutions include locally situated networked devices (which may be part of their own networked infrastructure) that become trusted validation devices for authentication of other devices that wish to access an operable device in proximity of the trusted devices. The validation devices may become "trusted" by the operable device based on their relationship with an access granting device, as described in more detail below.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and implementations other than what is described herein.

Local Authentication

FIG. 1 is an illustration depicting an example environment in which an example accessor device (e.g., a mobile device or other device) may request/gain access to an example operable device, according to an embodiment of the present disclosure. FIG. 1 depicts an example 100 in which a user would like to access an operable device via a user device. In this particular example 100, a scenario is depicted in which a person temporarily rents a home (e.g., a vacation home), arrives at the home, and would like to enter it. Example 100 includes an access granting device 102, one or more validation device(s) 104, a user or accessor device 106 (e.g., a mobile phone or other mobile device), a network 107, and an operable device 108 (e.g., a door lock). Access granting device 102 may be a head-end device for an entity associated with operable device 108. In this example, access granting device 102 may be a central office device for a home rental company/business, or it may be a central office device for an entity associated with validation device(s) 104, where the entity has partnered with one or more home rental companies. For example, access granting device 102 may be a head-end device for a utility company that has partnered with a home rental company to provide authentication services, and validation device(s) 104 may be utility metering devices (e.g., gas meters, electric meters, water meters, etc.) that are located in proximity of the home 109. In this example, access granting device 102 may communicate with validation device(s) 104 and accessor device 106 via network 107. Network 107 may be a private network associated with validation device(s) 104 (e.g., a utility grid infrastructure), may be a public network such as the Internet, or may be another type of network. Accessor device 106 may be any type of user device, such as a mobile phone, tablet, or any other type of user device.

In this example, a user 110 of accessor device 106 may have reserved home 109 via a home rental company (e.g., via a home rental website) for a specific range of time (e.g., from 3 pm on Saturday July 12$^{th}$ to noon on Saturday July 19$^{th}$). At some point after the reservation was made, but prior to the start of the reservation period, user 110 and/or accessor device 106 may optionally have received a confirmation code, or access code, from access granting device 102 (or directly from the home rental company) to be used as part of the authorization process for access to operable device 108. Also prior to the start of the reservation period, validation device(s) 104 may have become trusted devices for providing authentication services on behalf of access granting device 102 (e.g., due to their relationship with access granting device 102), an example of which is discussed in more detail below.

Figure 2:
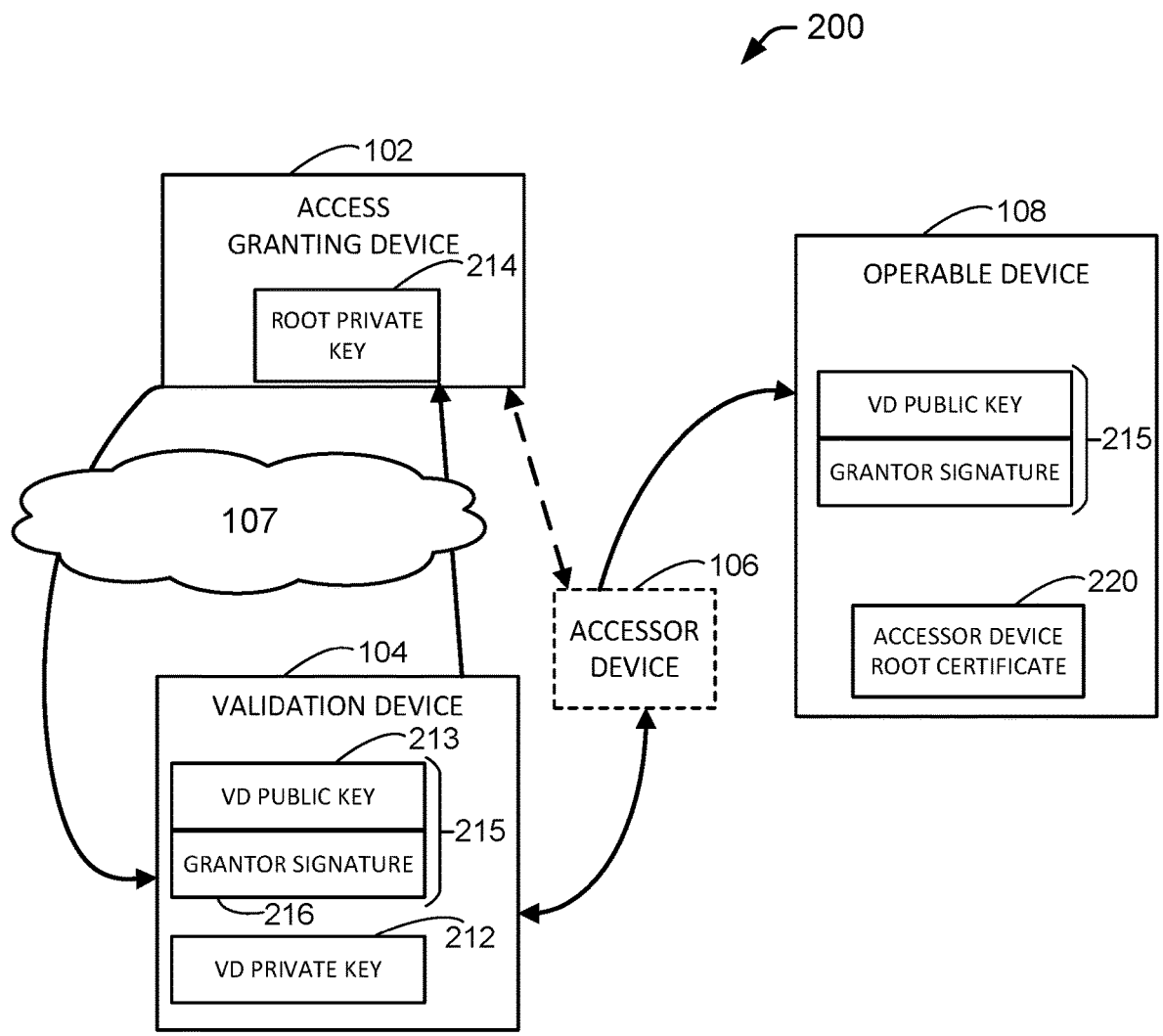
FIG. 2 is a block diagram illustrating components of an example communication environment for providing access to an example operable device, according to an embodiment of the present disclosure.

In an embodiment, one way for a validation device 104 to be added to a chain of trust in order to be trusted by operable device 108 for signing messages related to access is by a key submission/certificate generation with access granting device 102 (though other methods may alternatively be used). A key submission/certificate generation for entrusting a validation device may be demonstrated as shown in example 200 of FIG. 2. At the time operable device 108 is manufactured, it is unknown at what location operable device 108 will be installed, and therefore at that time it is yet unknown that it will be installed in the vicinity of validation device 104. In an embodiment, operable device 108 may be given on certificate (e.g., root certificate 220), and therefore only "trusts" access granting device 102. The following describes a method in which operable device 108 may subsequently acquire trust of validation device 104, according to an embodiment.

In example 200, validation device 104 may have a private key 212 (which may be generated from an internal random number generator, or may be generated in other ways) and private key 212's corresponding public key 213. Validation device 104 may bundle cryptographic material or other data, including at least its public key 213 and possibly an identifier of the operable device (e.g., an electronic serial number of the operable device or other identifier). Validation device 104 may have previously obtained information identifying a proximate operable device directly from an operable device in its vicinity (e.g., if the operable device is capable of communicating directly with validation device 104 and/or capable of self-establishing its "neighboring" devices), or indirectly from access granting device 102 after the operable device is registered with a corresponding service (e.g., via the owner of the operable device who may register the device once installed). In the latter scenario, access granting device 102 (or an entity associated with access granting device 102) may determine what validation device(s) 104 are in the vicinity of the registered operable device and can provide those validation device(s) with information regarding the registered operable device. Validation device 104 may submit the bundle in a message to access granting device 102 via network 107 for certificate generation. Using its root private key 214, access granting device 102 may sign the received bundle (as a trusted anchor device) and send the signed bundle as a certificate 215 back to validation device 104, which may then provide certificate 215 to operable device 108 (e.g., directly, or via another device). Certificate 215 is then trusted by operable device 108 because certificate 215 is authenticated by the public key embedded in root certificate 220. Certificate 215, having become trusted by operable device 108, is the means for access granting device 102 to delegate its trust (e.g., for a specific or indefinite span of time) to validation device 104. In an embodiment, signed certificate 215, which may include at least validation device 104's public key 213 and access grantor signature 216, may be provided to operable device 108 (e.g., directly or via an accessor device 106 that is ready to access operable device 108). After operable device 108 has accepted certificate 215, it may authenticate messages sent to it against the public key 213 in certificate 215, and therefore anything which was signed by the private key 212. Through this process, operable device 108, having added validation device 104 to its chain of trust, may now accept access requests authenticated by validation device 104. It is these requests authenticated by validation device 104 which will allow access to operable device 108, and not certificate 215 in itself. For example, when a user of accessor device 106 is in proximity of the home 109 and attempts to access the door lock (operable device 108) (e.g., via an application on accessor device 106 that engages (e.g., via a short-range communication method, over a network, etc.) with validation device 104), validation device 104 may sign an access (or permission) certificate asking operable device 108 to allow the holder of accessor device 106 access to the house (e.g., indefinitely or over a predetermined range of time specified in the certificate). Operable device 108 may authenticate this signed access certificate against validation device 104's public key, which is embedded in certificate 215. The access certificate may be passed through accessor device 106 to operable device 108, and validated by operable device 108, authenticated by certificate 215 which is anchored by root certificate 220, signifying that accessor device 106 is authenticated and allowed to access operable device 108. In an embodiment, this trust of validation device 104 may be solely for authenticating the currently present accessor device 106. In another embodiment, this trust of validation device 104 may be maintained for the currently present accessor device 106 and for future accessor devices 106 that come along and desire to access operable device 108. In yet another embodiment, the signed certificate 215 may need to be updated periodically. For example, the signed certificate 215 may expire after a predetermined time period, or due to other criteria, and would need to be re-signed by the access granting device.

One beneficial aspect of authorizing a validation device 104 to authenticate accessor devices 106 is that it allows the added security of verifying that the accessor device 106 is near, or within an expected proximity of, operable device 108. The validation device 104 may verify the local presence of an accessor device 106 via reported global positioning data from accessor device 106, by communicating with accessor device 106 using a short-range communication technology (e.g., radio frequency identification (RFID), Bluetooth, Wi-Fi, ZigBee, infrared, near-field communications, ultraband, etc.), by presenting a value or code on a display of validation device 104 to be read and input by a user of accessor device 106, or in other ways. Another benefit of authorizing (and in particular, pre-authorizing) a validation device 104 to authenticate accessor devices 106 is the saving of time. If a local device is pre-authorized to authenticate an accessor device 106 that comes along, the accessor device 106 may not need to access a remote access granting device 102 to be authenticated and can therefore more quickly access the operable device 108. A further benefit of this local authentication is that, if after an accessor device 106 is granted permission to access an operable device 108 the permission needs to be revoked, access granting device 102 may provide a revocation instruction to validation device 104 to prevent accessor device 106 access to operable device 108 (e.g., from that point forward, until a preauthorized time, etc.). This provides a level of security that may not be available without the localization of authentication provided by this disclosure.

Figure 3:
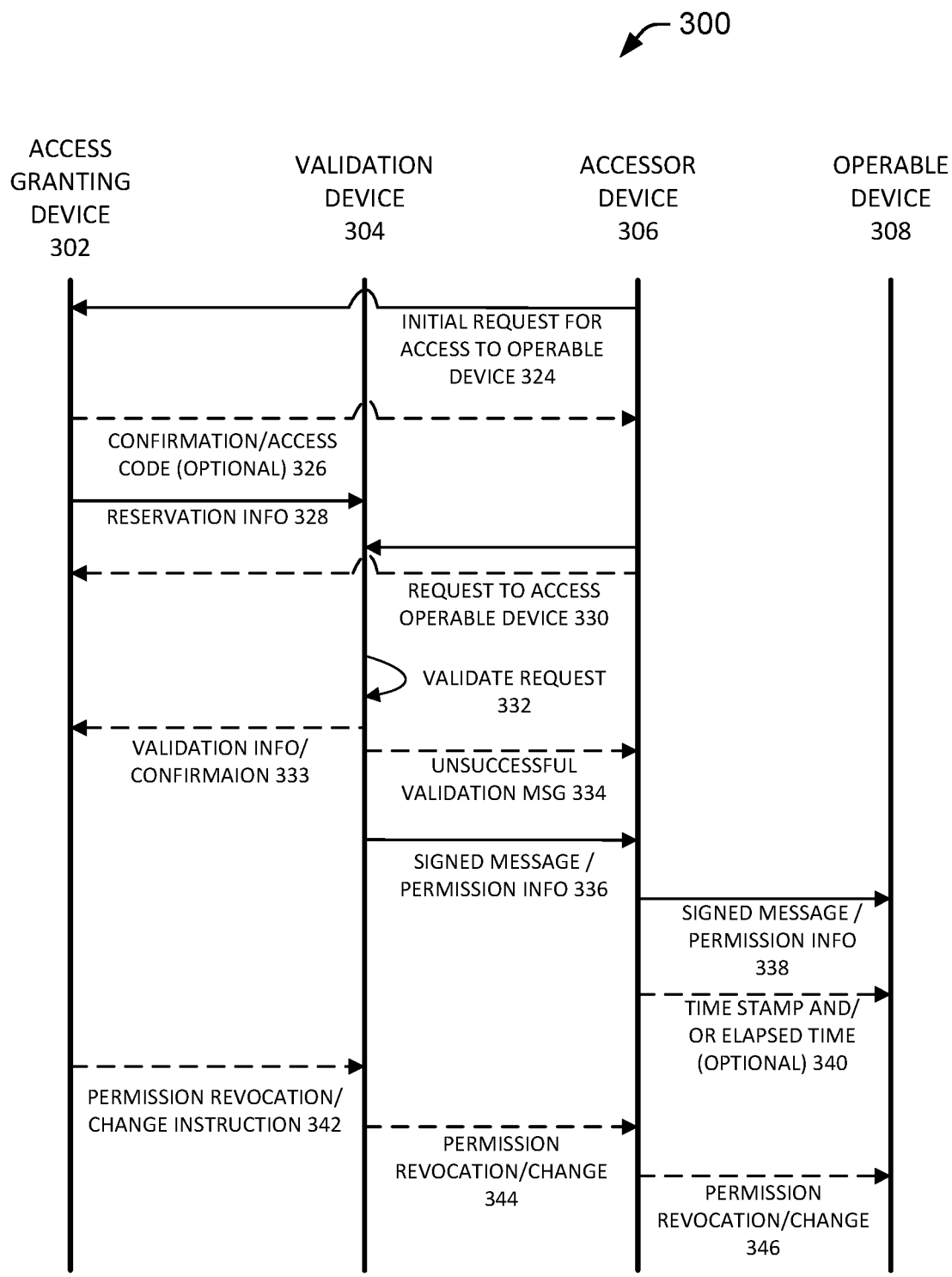
FIG. 3 is a sequence diagram illustrating an example of access authorization communications between networked devices, according to embodiments of the present disclosure.

FIG. 3 is a sequence diagram 300 illustrating an example of access authorization communications between communications devices in more detail, according to embodiments of the present disclosure. In this example, validation device 304 has been pre-authorized to authenticate usage of an operable device 308 locally in its proximity, as discussed above. In this example, an accessor device 306 (e.g., a mobile device of a user) may send an initial request for access to operable device 308 (e.g., a door (or door lock) to a rental home) to access granting device 302 (324). In an embodiment, this may be accomplished via a user of accessor device 306 entering the request via a website or an application on accessor device 306 (e.g., a website or application associated with a rental home business). This particular initial request may also be conducted via a telephone call (or even in person) between the user and the rental home business. If the reservation is accepted, access granting device 302 may (in an optional embodiment) send a confirmation number and/or an access code to accessor device 306 (326). The optional access code may be used for further authentication when the user (with accessor device 306) is ready to access operable device 308 (e.g., either automatically via an application on accessor device 306, or by the user inputting the access code into a field in the application or directly into operable device 308 (e.g., a keypad at the door)). Upon acceptance of the reservation by access granting device 302, access granting device 302 may send information associated with the reservation to one or more validation device(s) 304 that are in proximity of operable device 308 (328). The reservation may include at least information necessary to authenticate accessor device 306 when the time comes to do so. For example, the reservation information may include an identifier of operable device 308 (e.g., an electronic serial number or other identifier), a cryptographic key, indication of what reservation features are available to this user (e.g., entry into home via main door lock (operable device 308), access to home media, access to a pool and/or pool heater, etc.), the start and/or end dates/times (e.g., the reservation time window) that the user may have access to the available features, etc.

Unless the reservation is cancelled (in which case, access granting device 302 would inform validation device 304 (not shown)), at some point, accessor device 306 may request to operate operable device 308 (330). Validation device 304, preferably within short or local communication range of accessor device 306, may receive the request 330. Request 330 may (in an optional embodiment) also be received by access granting device 302 (e.g., to provide an additional alternative for access (e.g., as a primary authenticator, or if validation device 304 becomes unavailable, or simply for record-keeping purposes, etc.)). Upon receiving request 330, validation device 304 may validate the request (332). For example, validation device 304 may verify that accessor device 306 is in fact within an acceptable proximity of operable device 308. As discussed above, validation device 304 may verify the proximity of accessor device 306 via reported global positioning data from accessor device 306, by being able to communicate with accessor device 306 using a short-range communication technology (e.g., radio frequency identification (RFID), Bluetooth, Wi-Fi, ZigBee, infrared, near-field communications, ultraband, etc.), or in other ways. Validation device 304 may also determine whether accessor device 306's request to access operable device 308 is within the authorized reservation time window. Validation device 304 may include other stipulations on this access request, such as whether a predetermined number of times the operable device 308 may be actuated has been reached, or whether further time constraints on when access can be granted have been complied with (e.g., access may be granted only between the hours of 8 am to 12 pm every day of the authorized reservation time window). Validation device 304 may also require accessor device 306 (or user thereof) to submit one of possibly several passcodes each time the user would like to access operable device 308. Any or all of the validation results and/or confirmation (successful or unsuccessful) may (in an optional embodiment) be sent by validation device 304 to access granting device 302 (e.g., if access granting device 302 is a primary authenticator, or for record-keeping purposes) (333). In an embodiment, validation device 304 may be trusted to be a primary authenticator on behalf of access granting device 302. In another embodiment, access granting device 302 may be a primary authenticator, and validation device 304 may be a secondary authenticator providing a second layer of validation (e.g., validating that an accessor device is in local proximity of an operable device it wishes to utilize).

If validation is unsuccessful (e.g., if accessor device 306 is not in the expected proximity of operable device 308, if the access request was outside of the authorized reservation time window, if validation failed due to missing information, errors, or other reasons, etc.), an unsuccessful validation message may be sent from validation device 304 to accessor device 306 (334). If validation is successful, permission-related information (e.g. a signed message or certificate, an access code, etc.) may be provided from validation device 304 to accessor device 306 (336). In an embodiment, this may be accomplished via a data message sent from validation device 304 to accessor device 306. The data message may include a signature (e.g., may be a signed message) and/or include other permission-related information that may then be provided from accessor device 306 to operable device 308 (338). In an alternative embodiment, an access code may be displayed on validation device 304, obtained by a user of accessor device 306, and input by the user into accessor device 306, or alternatively directly into operable device 308. In an example, the user may read the access code off of a display of validation device 304 and enter the access code into accessor device 306. In another embodiment, the user may, using accessor device 306, scan or take a picture of the access code on a display of validation device 304 instead of having to manually enter the access code. In an alternative embodiment, the user may read the access code off of validation device 304 and enter the code directly into operable device 308, if operable device 308 is equipped with user input capability.

In some implementations, the time and/or date is important. For example, in the example of a home rental, a renter is only authorized to access the rented home during one or more specific time periods (e.g., from 3 pm on Saturday July $12^{th}$ to noon on Saturday July $19^{th}$). In an embodiment, an authorized time period may be included in the permission-related information provided to operable device 308 in 338. In an embodiment, the permission-related information provided in 338 may also include a timestamp or time information (with or without an elapsed time value representing an elapsed time since the timestamp was generated). In another embodiment, a timestamp or time information (with or without an elapsed time value representing an elapsed time since the timestamp was generated) may be separately provided (e.g., not as part of the signed message) by accessor device 306 to operable device 308 (340). In an embodiment, a timestamp or time information may be included with the permission-related information provided in 338, while an elapsed time value representing an elapsed time since the timestamp was generated may be included separately from the provided permission-related information. A timestamp or time information (and elapsed time, if included) may be used to confirm being within an authorized time window, may be used to synchronize a clock of operable device 308, or may be used in other ways. Further discussion regarding timestamps and time information will be discussed later in this document.

In the event that there is a need to revoke or change permission to access operable device 308 (e.g., if a user cancels or changes a reservation prior to (or during) the authorization period, or for other reasons), access granting device 302 may send a permission revocation/update instruction to validation device 304 (342), so that validation device 304 may send a permission revocation/change message to accessor device 306 (344) (which in some embodiments may be passed on to operable device 308 (346)) in order to revoke or change the permission of accessor device 306 with regard to utilizing operable device 308.

Figure 4:
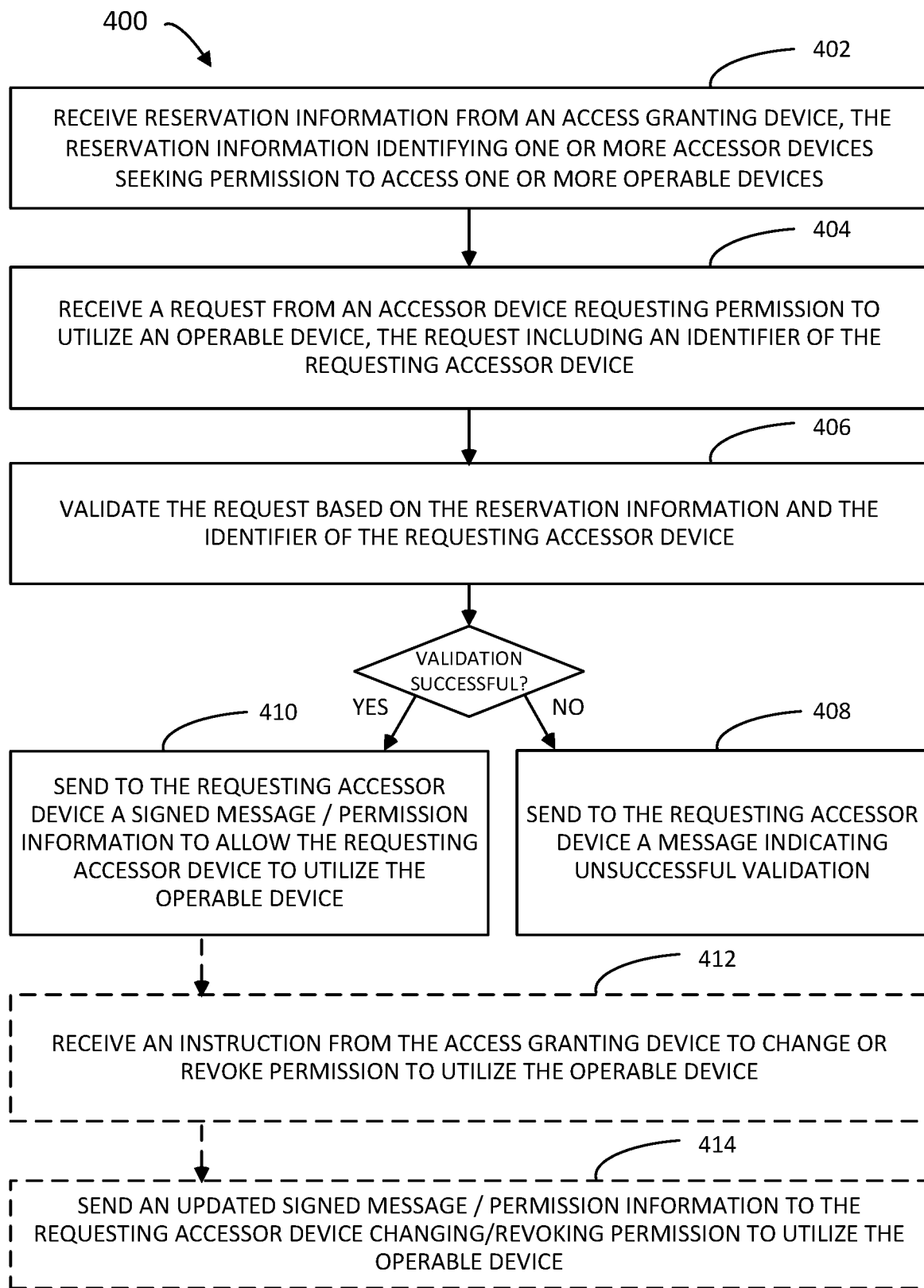
FIG. 4 is a flow diagram illustrating an example of validating an access request of an operable device from the perspective of a local validation device, according to an embodiment of the present disclosure.
Figure 5:
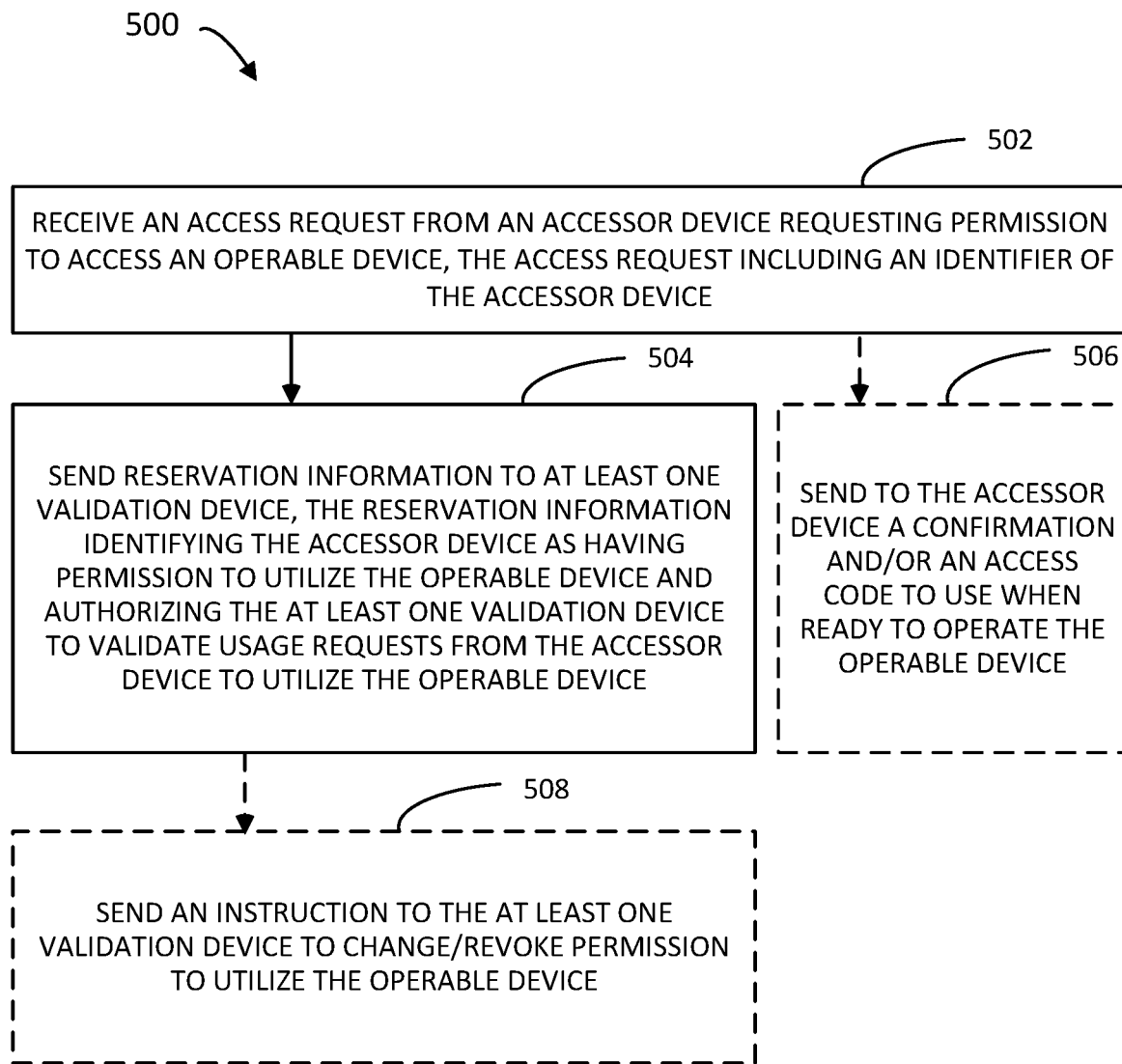
FIG. 5 is a flow diagram illustrating an example of authorizing access to an operable device from the perspective of an access granting device (e.g., a head-end device), according to an embodiment of the present disclosure.
Figure 6:
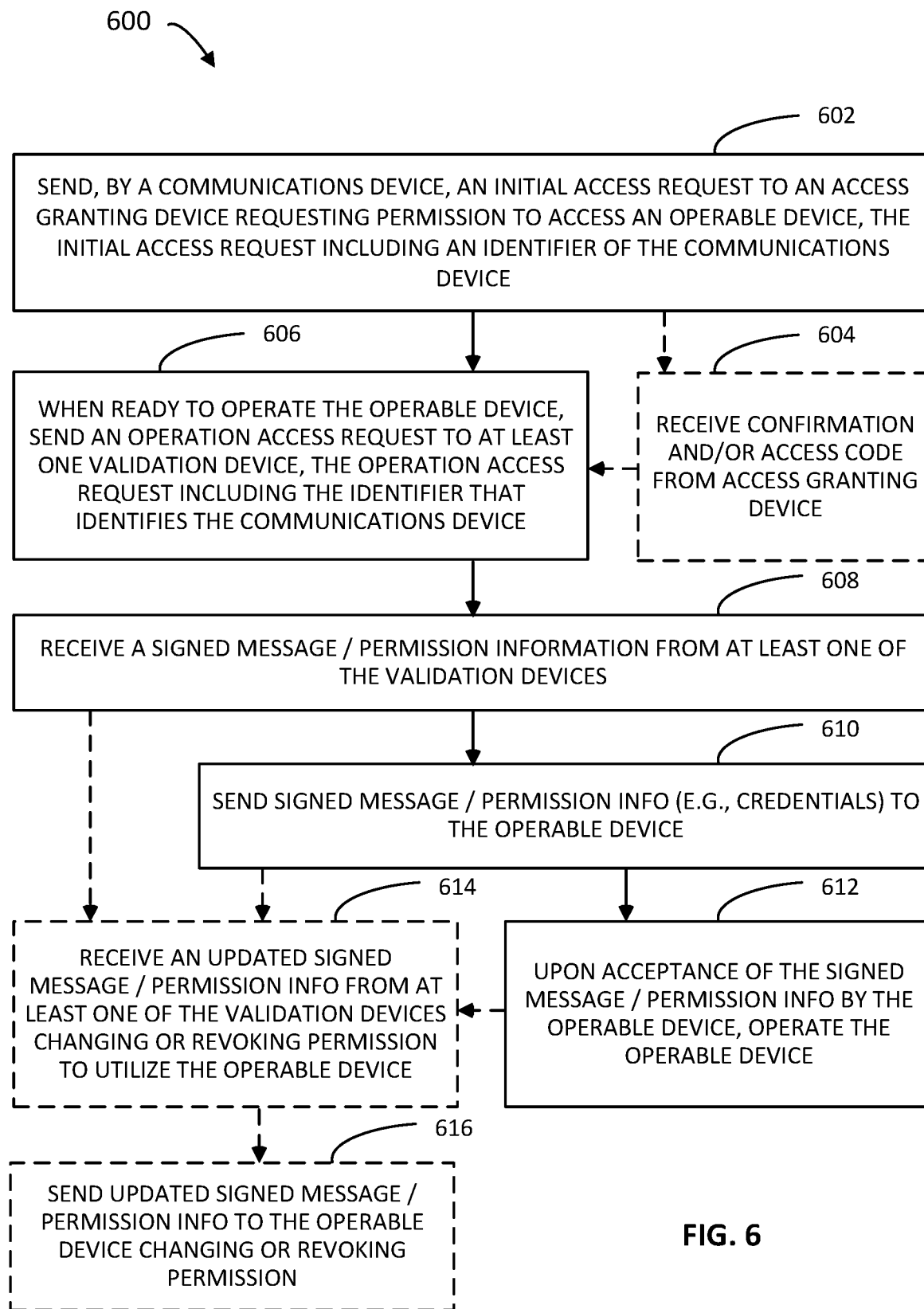
FIG. 6 is a flow diagram illustrating an example of requesting/obtaining authorized access to an operable device from the perspective of an accessor device, according to an embodiment of the present disclosure.

FIGS. 4-6 are flow charts depicting the process described above, but from different perspectives of specific devices. FIG. 4 is a flow chart 400 describing functionality from the perspective of a validation device 104/304, according to an embodiment of this disclosure. At 402, reservation information may be received by a validation device 104/304 from an access granting device 102/302. The reservation information may include information identifying one or more accessor devices 106/306 that is/are seeking permission to access one or more operable devices 108/308 (e.g., that is/are in an acceptable (e.g., predefined) proximity of validation device 104/304). As described earlier, an access granting device 102/302 may be a head-end device responsible for managing access to one or more operable devices (e.g., entrances such as doors/gates/locks of a house, hotel room, car, storage units, or other restricted access locations; household items/appliances such as televisions, stereos/audio systems, refrigerators, thermostats, security systems, lights, cameras, etc.; or other operable devices). A validation device 104/304 may be a device located in local proximity (e.g., a predefined proximity) of one or more operable devices 108/308, may be in communication with access granting device 102/302, and may be associated in some way with access granting device 102/302, as discussed earlier. In one example implementation, validation device 104/304 may be a utility meter (e.g., gas, electric, or water meter) physically located near an operable device 108/308, and access granting device 102/302 may be a head-end device for a utility company associated with validation device 104/304 (a utility meter), where the head-end device is also associated with operable device 108/308 either directly or indirectly (e.g., via an agreement with an entity directly associated with operable device 108/308). The receiving of reservation information by a validation device 104/304 at 402 may be considered as an initial set-up for the subsequent granting of permission to utilize operable device 108/308.

At 404, a request from an accessor device 106/306 may be received by validation device 104/304, the request including an identifier of accessor device 106/306. The request may optionally also include an identifier of the operable device 108/308 that is sought to be accessed, which may be needed in the event that there are multiple operable devices in local proximity of validation device 104/304. At 406, validation device 104/304 may attempt to validate the request based on the previously received reservation information and the identifier of the requesting accessor device 106/306. If validation is not successful (e.g., if the identifier is not recognized, if the request is made outside of an authorized reservation time window, if the reservation had been cancelled or revoked, etc.), at 408, validation device 104/304 may send to the requesting accessor device 106/306 a message indicating that the validation was unsuccessful. If validation is successful, at 410, validation device 104/304 may send to the requesting accessor device 106/306 a signed message (e.g., including permission-related information) to allow usage of operable device 108/308 by requesting accessor device 106/306. As discussed earlier, if there becomes reason to change or revoke permission of accessor device 106/306 to access operable device 108/308, validation device 104/304 may, at 412, receive an instruction from access granting device 102/302 to revoke or change permission for accessor device 106/306 to utilize operable device 108/308. If such permission change/revocation is received from access granting device 102/302, validation device 104/304 may, at 414, send an updated signed message to requesting accessor device 106/306 to revoke/change permission to utilize operable device 108/308.

FIG. 5 is a flow chart 500 describing functionality from the perspective of an access granting device 102/302, according to an embodiment of this disclosure. At 502, access granting device 102/302 may receive an access request from an accessor device 106/306, requesting permission to access an operable device, the access request including an identifier of accessor device 106/306. The access request may optionally also include an identifier of the operable device 108/308 that is sought to be accessed, which may be needed in the event that there are multiple operable devices 108/308 and perhaps the access request is not for all of them. At 504, reservation information related to the access request may be sent to at least one validation device 104/304 in local proximity to operable device 108/308. The reservation information may identify the accessor device 106/306 as having permission to utilize operable device 108/308. The reservation information may also authorize validation device(s) 104/304 (e.g., that is/are in a local proximity to operable device 108/308) to validate usage requests from accessor device 106/306 to utilize operable device 108/308. In an embodiment, at 506, access granting device 102/302 may (in an optional embodiment) send to accessor device 106/306 a confirmation and/or an access code to use when ready to operate operable device 108/308. In the event there becomes a reason to change or revoke permission of accessor device 106/306 to access operable device 108/308, access granting device 102/302 may, at 508, send an instruction to validation device(s) 104/304 to revoke or change permission for accessor device 106/306 regarding the use of operable device 108/308.

FIG. 6 is a flow chart 600 describing functionality from the perspective of an accessor device 106/306, according to an embodiment of this disclosure. An accessor device may be, for example, a user device (e.g., mobile phone, tablet, or other user device) of a user who would like to access/operate one or more operable devices 108/308. The accessor device may have installed applications, software, or other utilities (e.g., a web browser) that may allow an accessor device to access services for the user. In the example discussed above, an accessor device may be used to obtain services related to renting a home. The user may use an application or website of the service entity on the accessor device to request access to one or more operable devices 108/308. The user interfaces to these services are not described in detail herein, as there are many available services that may benefit from the concepts described herein that use many different user interfaces, as would be understood by one of ordinary skill in the relevant arts. In fact, in the example of a rental home service, there are a plurality of rental home services available to a user via a user device, and while these different (yet similar) service offerings are presented to the user in different ways, they could still each benefit from the techniques described herein.

Referring back to FIG. 6, at 602, an accessor device 106/306 may send an initial access request to an access granting device 102/302 requesting permission to access one or more operable devices 108/308, the initial access request including an identifier of accessor device 106/306. In an embodiment, accessor device 106/306 may, in an optional embodiment, receive from access granting device 102/302 a confirmation code and/or an access code to be subsequently used as part of the authorization process for access to operable device(s) 108/308. The confirmation or access code may be delivered to accessor device 106/306 via, or from, an applicable application on accessor device 106/306. At 606, when ready to utilize at least one of operable device(s) 108/308, an operation access request may be sent from accessor device 106/306 to at least one validation device 104/304, the operation access request including the identifier that identifies accessor device 106/306. The operation access request may also include an identifier for each of the specific operable devices 108/308 for which access is being requested. The operation access request may also include an access code that was previously provided to the accessor device 106/306 by access granting device 102/302. At 608, accessor device 106/306 may receive a signed message (e.g., including permission-related information) from at least one of the validation device(s) 104/304 that is in local proximity of one or more of operable device(s) 108/308 and has previously established authority to validate such requests, as described above. The signed message may include information regarding permissions available to accessor device 106/306. This may include authorization/credentials for indefinite unlimited access and/or features, limited access (e.g., by time and/or dates), limited features (depending on feature options available on operable device(s) 108/308), etc. This may instead include no access to one or more of operable devices 108/308 (e.g., if identifiers are not recognized, if the request is made outside of an authorized reservation time window, if the reservation had been cancelled or revoked, etc.). At 610, the received signed message (e.g., including credentials, authorizations, limitations, etc.) may be provided to the applicable operable device(s) 108/308. At 612, upon acceptance of the signed message by operable device(s) 108/308 (e.g., recognition of authorization), accessor device 106/306 may operate operable device(s) 108/308 as authorized. In the event that there is a reason to change or revoke permission of accessor device 106/306 to access operable device(s) 108/308, at 614, accessor device 106/306 may receive an updated signed message from at least one validation device 104/304 to change or revoke permission for accessor device 106/306 to use one or more of operable device(s) 108/308. At 616, an updated signed message may be sent by accessor device 106/306 to applicable operable device(s) 108/308 changing or revoking permission to access those operable devices.

Trust Aggregation and Time Synchronization Via Multiple Devices

In the above described examples, validation of an accessor device 106/306 is shown to be provided by a validation device 104/304 in proximity of operable device 108/308. In an embodiment, if there are more than one validation device in proximity of operable device 108/308, it may provide added security to vary which validation device 104/304 is used each time a validation is needed. Even stronger validation may be provided if a single validation comes from more than one validation device 104/304. In an example described above, where a utility meter may be a validation device, there may be multiple meters within local communication range of operable device 108/308. Validation may be set to occur when two or more of these polled validation devices are in agreement, making validation of an accessor device 106/306 that requests to access operable device 108/308 more robust. There are a number of ways this may be done. For example, all of the validation devices (or a predetermined number or percentage of them) in local communication range of an operable device may need to agree that the requesting accessor device is within a predetermined distance of the operable device (and/or of the validation devices), and/or that the accessor device's request is within an authorized time window for access, and/or that any other predetermined criteria is met.

Figure 7:
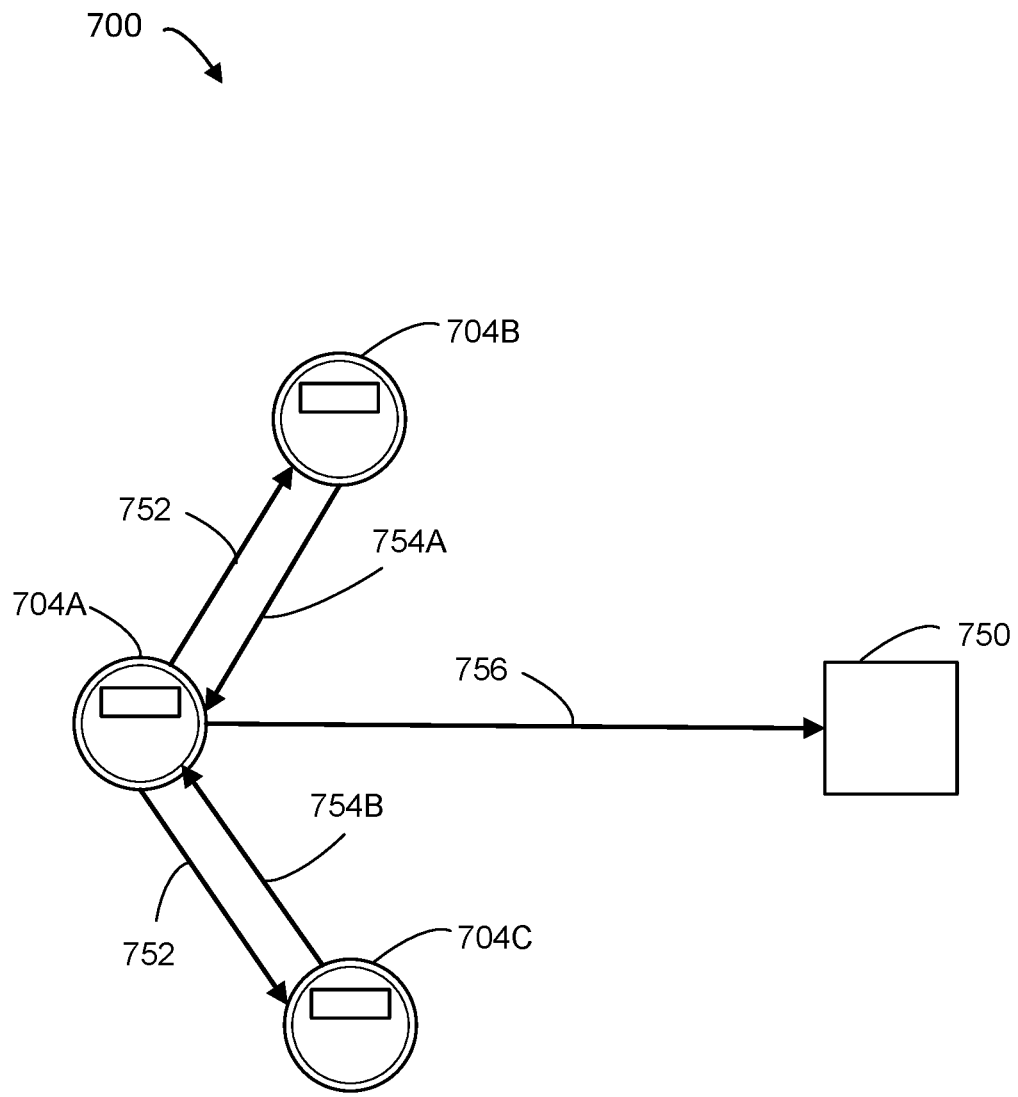
FIG. 7 is an illustration depicting multiple devices communicating to reconcile a data item prior to sending the reconciled data item to another device.

In an embodiment, the collection of input and/or determination of polled results may be conducted by a lead or master validation device. A validation device may be deemed a lead validation device in various ways (e.g., by being closest in proximity to an operable device, by being designated by an access granting device, etc.). If a lead validation device goes down or otherwise goes offline, another validation device in proximity to the operable device may become a lead validation device. An example (700) of this device polling is shown in FIG. 7, where a lead validation device 704A sends out a poll 752 (e.g., requesting a validation result) to other validation devices 704B and 704C in local communication range. Validation devices 704B and 704C send back poll responses 754A and 754B, respectively. Lead validation device 704A may analyze the received poll results (which may also include its own validation determination), and may make a final validation determination based on this collected information before generating and sending a signed message and/or other permission information 756 to accessor device 750. In an alternative embodiment, the accessor device (via an application directing the access request), rather than a lead validation device, may collect the input from validation devices 704A/B/C and/or determine the final validation result based on the input.

Validation of an accessor device's request is not the only beneficial usage of this trust aggregation concept. Any data point needed by an accessor device or operable device may benefit from this (e.g., time, temperature, height or altitude, weight, humidity, moisture, pressure, brightness, light, proximity, voltage, current, level, amount, fluid flow rate, gas presence, gas flow rate, gas density, smoke, fog, etc., that may be measured or obtained via sensors, clocks, etc., and that are within, in communication with, or readable by any of the devices described herein). For example, time/date accuracy is important in the home rental example. Time synchronization is important for all devices that may work together (e.g., validation devices, accessor devices, and operable devices), but is especially important for the operable devices, whose use may depend on time accuracy. Unfortunately, operable devices that are powered by battery are likely to experience a time drift, especially if the battery starts to weaken, dies, or is removed. If the operable devices are not connected, or are not able to be connected, to a network such as the Internet, these devices would be unable to regularly update their time in that way (via the Internet). Time synchronization via locally proximate devices is a solution to this problem. In an example, timestamp data (e.g., including a timestamp from a real-time clock) may be collected from validation devices (e.g., in the ways described above in the discussion of FIG. 7 (via a lead validation device, or without a lead validation device if polled by an accessor device, for example)). In an optional embodiment, the timestamp data from each device may also include an elapsed time since the timestamp was generated to provide more accurate time information. The collector of the timestamp data (e.g., a lead validation device or an accessor device) may analyze the received timestamp data to adjust its own clock (e.g., a real-time clock) or time record with a more accurate time, and/or may pass the more accurate time data along to an accessor device and/or an operable device (with or without optional additional elapsed time data) to adjust their clocks or time records (thereby synchronizing the device clocks). The analysis of the timestamp data may include one or more of comparing the timestamp data, determining timestamp data that is acceptable and ignoring data that is not trusted (e.g., timestamp data that differs from the other received timestamp data by a predetermined threshold amount), averaging the acceptable trusted time data, reconciling the data to make an accurate time determination based on a given algorithm, etc. In an embodiment, determining whether data is acceptable may be based on a relationship of the received data points to a predetermined baseline (e.g., how far away from a predetermined value or threshold). In an embodiment, determining whether data is acceptable may include determining whether the values of the received data are within a predetermined threshold of each other. These are just some of many ways to determine acceptability of received data.

Figure 8:
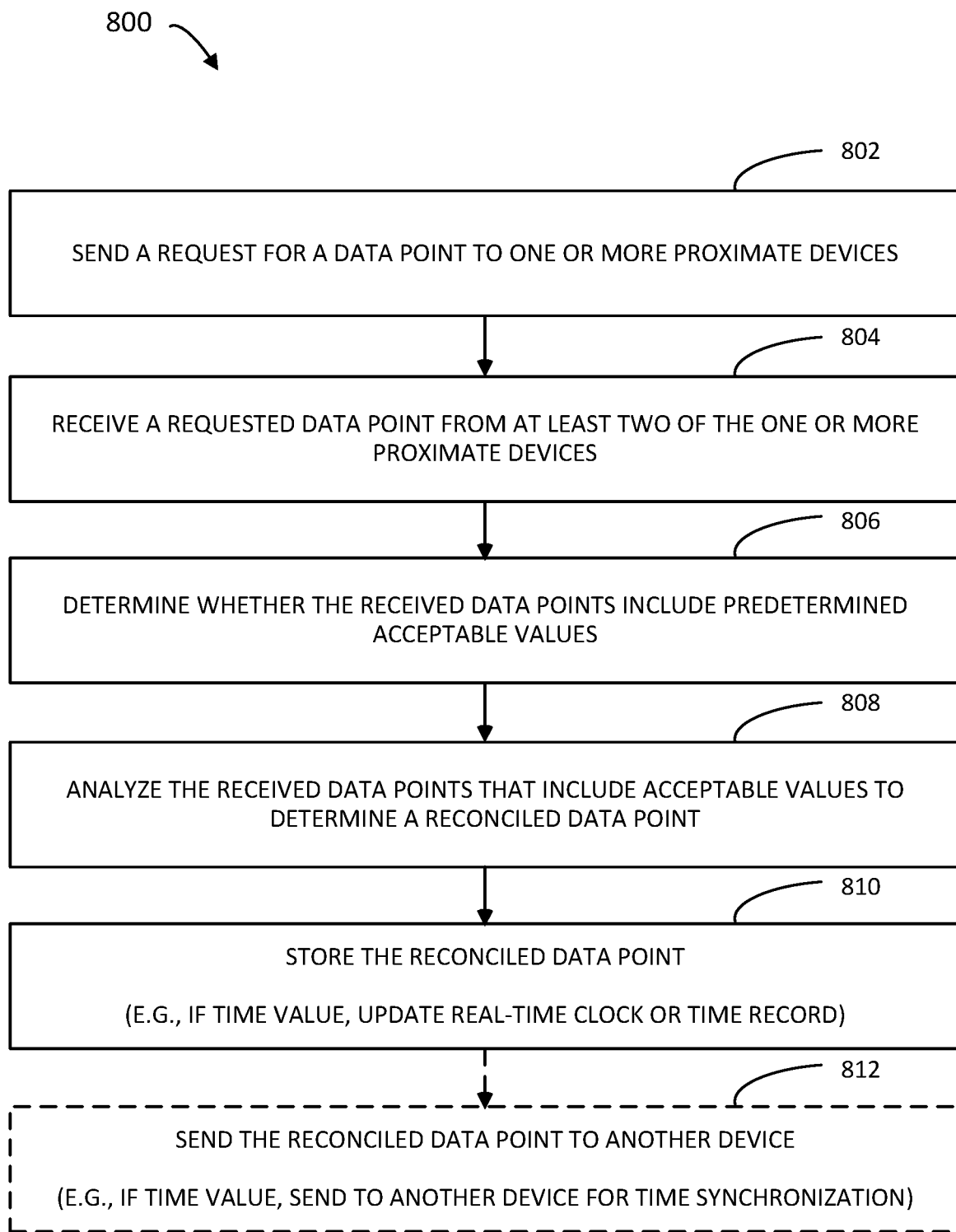
FIG. 8 is a flow diagram illustrating an example of reconciling a data item via multiple communicating devices.

FIG. 8 is a flow diagram illustrating a general example 800 of reconciling a data point via multiple proximate communicating devices. Example 800 is from the perspective of a lead data collecting device. In the examples described earlier, the lead device may be, for example, a validation device or an accessor device. In some embodiments, the lead device could be an operable device. At 802, a request for a data point may be sent to one or more proximate devices from the lead data collecting device. A proximate device may be any device within local communication range (e.g., short range) of the requesting device. At 804, a requested data point may be received from at least two of the one or more proximate devices. In an embodiment, the requesting device may be included in the at least two devices, as the requesting device may also have the capability of obtaining a requested data point. In an example where the reconciled data point is a current time value, an elapsed time since the timestamp was taken (e.g., until the time it was sent to the requesting device), may accompany the received data point (which in the time example may be a timestamp). At 806, it may be determined whether the received data points include predetermined acceptable values (e.g., within a predetermined range, within a predetermined amount away from a predetermined (or baseline) value, within a predetermined amount away from each other's obtained data point, etc.). At 808, the received data points that include acceptable values may be analyzed, and a reconciled data point may be determined based on the analysis. The determination may be made using any appropriate method for that type of data point, including, for example, averaging the acceptable data points, finding a median of the acceptable data points, etc. The more devices polled for a data point, the more accurate the reconciled data point will be. At 810, the reconciled data point may be stored. In an example where the reconciled data point is a current time value, a clock may be updated. At 812, the reconciled data point may optionally be provided to one or more other devices. For example, where the reconciled data point is a current time value, the reconciled time value may be sent to one or more other devices for time synchronization. In an embodiment, the reconciled time value may be sent to the one or more other devices with an elapsed time value. The elapsed time value may take into account, for example, an elapsed time since a timestamp (e.g., the earliest timestamp) from the one or more proximate devices was taken (or may be an estimation of such), processing time, network latency, etc.

As can be understood from reading this document, there are many different ways to obtain a piece of information. In the examples above that include validation device(s), accessor device(s), and operable device(s), there are many ways to share a data point to varying degrees of accuracy. Taking the example of synchronizing and/or updating time on, for example, an operable device, there are many ways this can be done. For example, a timestamp may be provided to the operable device directly from a validation device or accessor device, or from a validation device via an accessor device. In an embodiment, the timestamp may be provided with an elapsed time from the validation device, with an elapsed time from the accessor device, or with an elapsed time that takes into account elapsed times from both the validation device and the accessor device, where an elapsed time may be a time from when a timestamp is taken at a device to when it is sent from the device. In another embodiment, an elapsed time (from the validation device, the accessor device, or both) may be an estimated elapsed time (e.g., a historically averaged estimated delay time) as opposed to a measurement of real time. In an embodiment, a current time may be based on time information collected from multiple devices (e.g., multiple validation devices, multiple accessor devices, or a combination of both). In a further embodiment, the time information collected from multiple devices may be analyzed to determine a most accurate real time, as in the trust aggregation example described earlier. These scenarios may also be combined in various ways. In an embodiment, to increase trust of the data, timestamps (or other data) only from validation devices (directly or through accessor devices) may be used for time synchronization efforts, etc.

Figure 9:
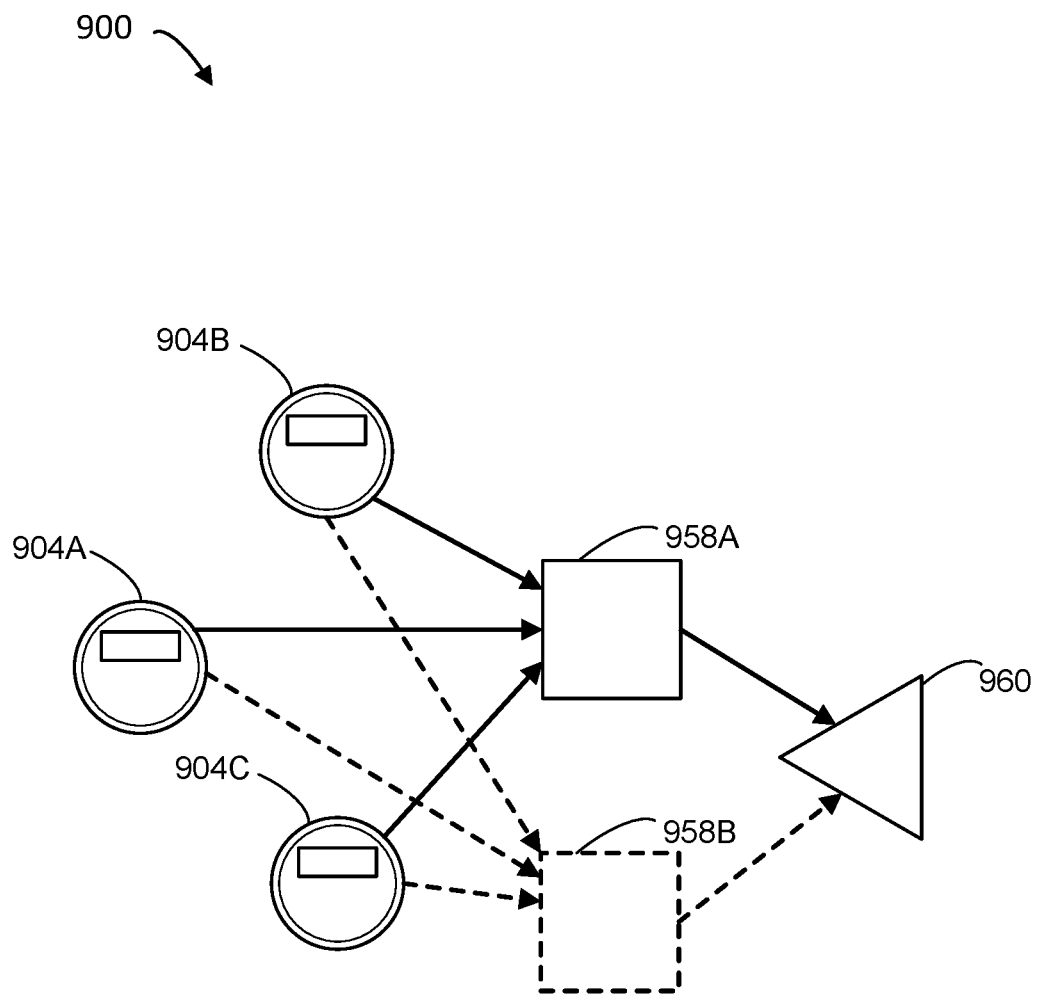
FIG. 9 is an illustration depicting multiple devices communicating to reconcile a data item prior to sending the time data item to another device, according to an embodiment of the present disclosure.

FIG. 9 illustrates a combination of some of the scenarios described above. For consistency and understanding, the time synchronization example will continue to be used in this description of FIG. 9. In example 900, a first accessor device 958A (e.g., a mobile device of a renter of a rental home) may obtain timestamp data (e.g., a timestamp, with or without elapsed time or estimate) from one or more validation devices (in this example, three validation devices 904A-C). First accessor device 958A may analyze the collected timestamp data and determine a likely current time. In an embodiment, first accessor device 958A may include its own timestamp data in the analysis and current time determination. First accessor device 958A may send the current time determination to operable device 960 (with or without an elapsed time (or estimate) to take into account processing time, network delay, etc.) Operable device 960 may update its real-time clock (if it has one) or its time record with the current time information received from first accessor device 958A. (This process may be done in conjunction with a request to access operable device 960, described earlier in this document. For example, when an accessor device communicates with operable device 960 in order to access the operable device, this time update process may be conducted.) Some time later, a second accessor device 958B may come along (e.g., a mobile device of a subsequent renter of a rental home). The same process may occur via second accessor device 958B, providing a new time update to operable device 960. With each time update to operable device 960 via subsequent accessor devices, the time at operable device 960 may remain relatively current, even if it does not have its own clock or if it is not in direct communication with the Internet. In an embodiment, the second accessor device may be the same as the first accessor device, but at a different instance in time.

There are ways to make the time update process described above even more robust.

Figure 10:
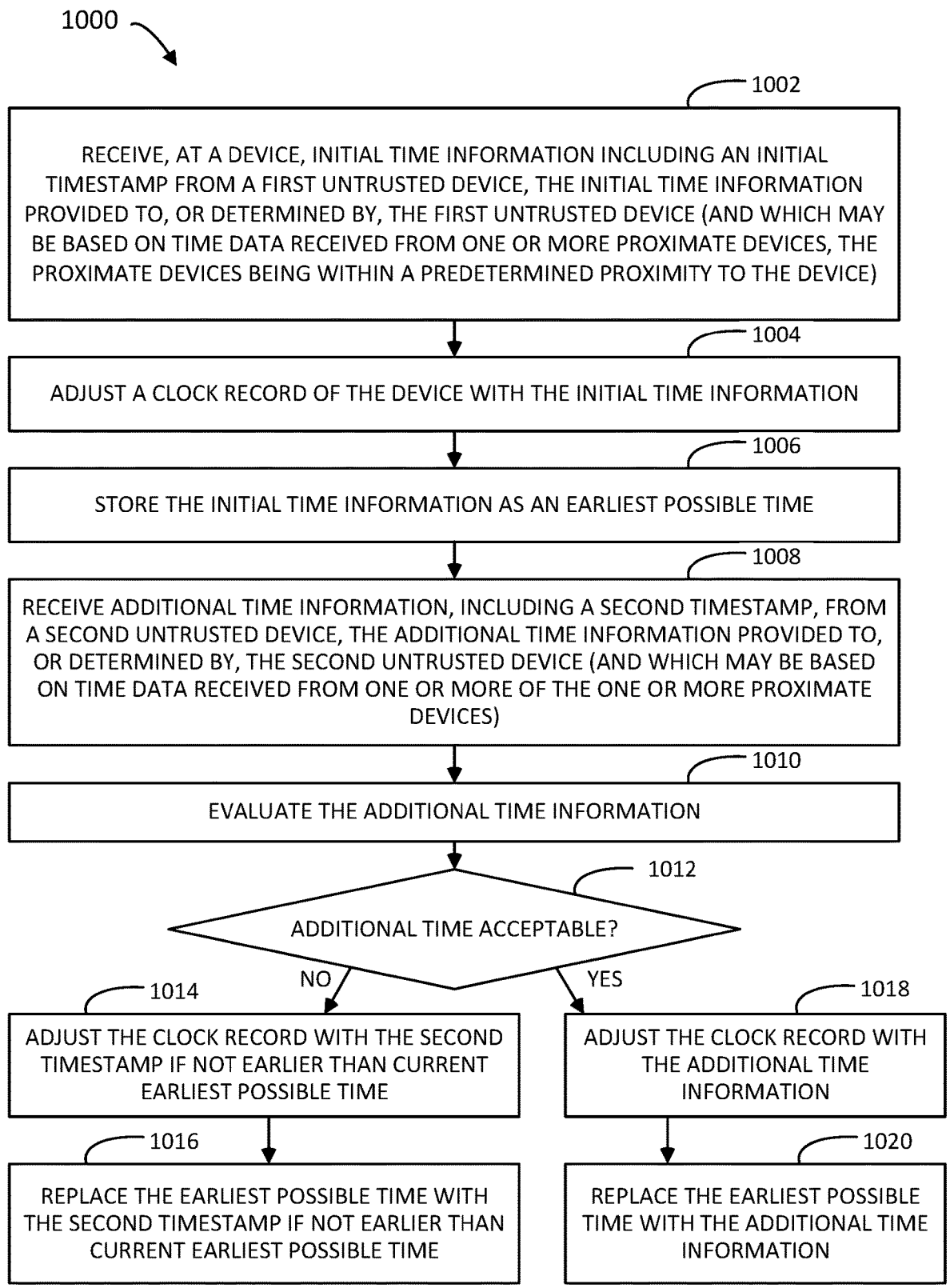
FIG. 10 is a flow diagram illustrating an example of reconciling a time data item via multiple communicating devices, according to an embodiment of the present disclosure.

FIG. 10 illustrates an example 1000 of a process from the perspective of a device (such as an operable device) whose time is to be updated using time information provided from one or more "untrusted devices" (such as accessor device(s)), according to an embodiment of the present disclosure. At 1002, the device may receive initial time information from a first untrusted device. The initial time information may include an initial timestamp from the first untrusted device, and may also include an elapsed time (e.g., since the initial timestamp was obtained) and/or other time delay information (e.g., processing time, network latency information, etc.). The initial time information may have been provided to, or determined by, the first untrusted device based on time data received from one or more proximate devices (e.g., devices within a predetermined proximity (e.g., local communication range) to the device, such as validation device(s)) as discussed earlier. At 1004, a clock record of the device may be adjusted with the initial time information. If the device has a clock, the clock may be adjusted. If there is no clock, the initial time information may be stored in a memory location designated for such time information (a time record). At 1006, the initial time information may be stored as an earliest possible time. Keeping track of earliest possible time information is beneficial in case subsequent time information is received that indicates a time earlier than that stored as the earliest possible time.

The device may receive additional time information from subsequent untrusted devices. For example, at 1008, the device may receive additional time information from a second untrusted device. In an embodiment, the second untrusted device may be the same as the first untrusted device but at a different instance in time. The additional time information may include a second timestamp from the second untrusted device, and may also include an elapsed time (e.g., since the second timestamp was obtained) and/or other time delay information (e.g., processing time, network latency information, etc.). The additional time information may have been provided to, or determined by, the second untrusted device based on time data received from one or more proximate devices (e.g., devices within a predetermined proximity (e.g., local communication range) to the device, such as validation device(s)) as discussed earlier. At 1010, the additional time information may be evaluated to determine if the information is acceptable. For example, the additional time information may be checked to determine if it indicates a time earlier than the currently recorded earliest possible time. If so, the additional time information may be ignored. The additional time information may be checked to determine if any accompanying elapsed time or other time delay information is outside of a predetermined threshold amount away from an expected value (e.g., a known constant, a value within a known range, a value determined based on historical information from previous untrusted devices, etc.). At 1012, if the additional time information is not acceptable, proceed to 1014. At 1014, if the second timestamp is not earlier than the current earliest possible time, the clock or time record may be updated to reflect the second timestamp (itself), and at 1016, the earliest possible time may be replaced with the second timestamp (itself). If, at 1012, the additional time information is acceptable, proceed to 1018. At 1018, the clock record may be updated to reflect the additional time information (including the second timestamp and any elapsed time or time delay information), and at 1020, the earliest possible time may be replaced with the additional time information (including the second timestamp and any elapsed time or time delay information). These additional steps help maintain better accuracy in the time record of a device that has to rely on other devices for its time information. It would be understood by those of ordinary skill in the relevant art after reading this disclosure, that this same technique would similarly be useful via trusted devices (as opposed to untrusted devices).

Man-in-the-Middle Extender Defense

Any communication between devices may be vulnerable to a man-in-the-middle (MITM) attack. In cyber security, a MITM attack may involve a malicious party/device that secretly eavesdrops, intercepts and/or relays, and may even alter, a communication between two devices that believe they are in direct communication with each other. In a man-in-the-middle extender (MITME) attack, a malicious party/device may intercept and copy a message between devices in order to wrongfully "extend" the distance between communicating devices. This gives two advantages to the attacker. First, unlike many or most MITM attacks, in this first scenario a MITME attack does not attempt to decipher or modify the message sent between the two parties. The MITME attacker simply wants to extend the physical distance between two communicating peers, with this distance extension being used to the advantage of the attacker. Second, a malicious may have stolen credentials (e.g., by hacking into an access granting device). In this scenario, the MITME device may send a message to the malicious device, which then sends an authenticatable reply back to the receiving party.

An example of the first scenario may involve a malicious device that copies a message from a key fob of a keyless entry system (e.g., for a car) in order to subsequently use the intercepted message to open the car without the key fob. In this scenario, a car key fob resting on a kitchen countertop could be used by a thief to open a parked car on a street. The home rental example used throughout this specification may present the second scenario, in which a MITME attack may involve a MITM device that intercepts a message between a first device and a second device (e.g., between a validation device and an accessor device, between an accessor device and an operable device, etc.), and sends a copy of the message to a remote malicious device (which perhaps may have stolen credentials from an access granting device, and may thereby be authenticated by the second device), the malicious device subsequently using that message to access an entity controlled by the second device. An example of this is depicted in FIG. 11.

Figure 11:
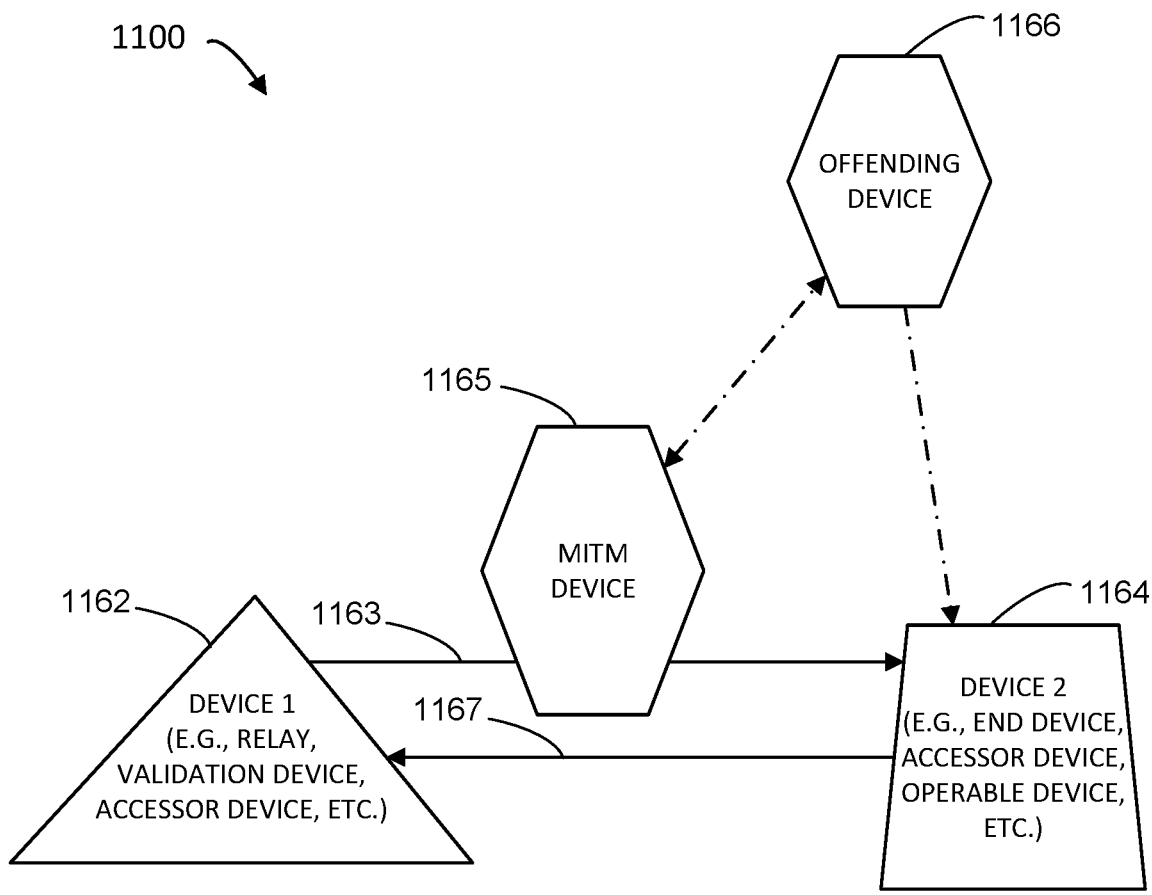
FIG. 11 is a block diagram depicting a man-in-the-middle (MITM) example where a malicious device obtains data to subsequently attempt to access an operable device.

In example 1100 of FIG. 11, a first device 1162 may send a message 1163 to a second device 1164. In the home rental example, first device 1162 may be, for example, a validation device, accessor device, any relay device (e.g., a relay device with a signed root certificate), etc. Second device 1164 may be, for example, an accessor device, an operable device, any end device, etc. A MITM device 1165 may eavesdrop and intercept message 1163 and may send a copy of the message to a remote device 1166. Remote device 1166 may have even previously hacked into access granting device and stolen device credentials (e.g., for accessing the second device). Message 1163 may include information authorizing a device to access second device 1164 or another end device controllable by second device 1164, and may even include validation information that the first or second device is a local device rather than a remote device. Remote device may subsequently send message 1163 (e.g., intact or altered) to second device 1164, and device 1164 may extend access to remote device 1166 innocently believing that remote device 1166 has been locally authorized for access when it has not.

Figure 12:
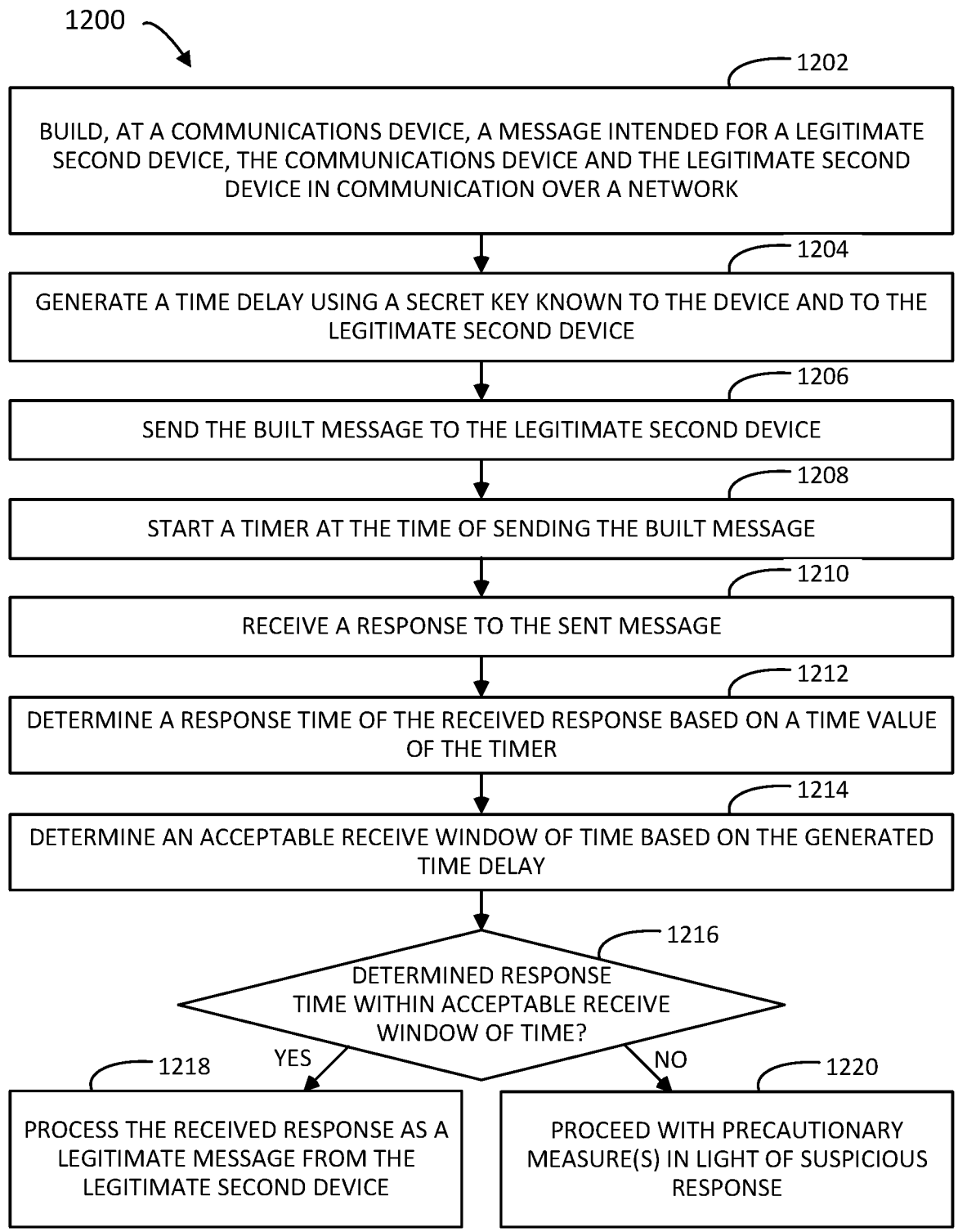
FIG. 12 is a flow diagram illustrating an example of defending against a MITM occurrence from the perspective of a sending device, according to an embodiment of the present disclosure.

One way to defend against a MITME attack is to make the message exchange between the two devices difficult to send to a remote device without causing an error condition detectable by the receiving device. One way to accomplish this is to introduce a secret timing constraint between the message exchange of the two devices, one that would be difficult to decipher or mimic, where the time constraint would be very difficult for a malicious device to meet. This may be accomplished by having legitimate communication devices use a secret value to determine the timing of messages between them. FIG. 12 illustrates an example 1200 of defending against a MITME occurrence from the perspective of a sending device, according to an embodiment of the present disclosure. At 1202, a first communications device (i.e., sending device) may build a message intended for a legitimate second device, the first communications device and the legitimate second device capable of communication over a network. In the context of the present disclosure, the first communications device and the legitimate second device may be a validation device and accessor device, or an accessor device and operable device, or an access granting device and validation device, for example. At 1204, a time delay may be generated by the first communication device using a secret key known to the first communications device and to the legitimate second device. The secret key may have been provided to the first communications device prior to building the message (e.g., prerecorded at the first communications devices (e.g., during manufacturing, configuration, etc.), or in a message previously received from the legitimate second device or another trusted device (e.g., an encrypted key)). The time delay may take into account such information as, for example, message processing time, anticipated network latency, etc. At 1206, the first communications device may send the built message to the legitimate second device. In an embodiment, the built message may include a copy of the secret key (e.g., an encrypted copy). At 1208, a timer may be started by the first communications device at the time of sending the built message. The timer may be an initial timestamp from a real-time clock, or may be a timer (or time counter) that starts at zero time, for example. At 1210, a response may be received at the first communications device. At 1212, a response time of the received response may be determined based on a time value of the timer at the time the response was received. At 1214, the first communications device may determine an acceptable receive window of time based on the generated time delay. The tighter (e.g., smaller) this acceptable receive window of time is, the stronger the security. At 1216, it may be determined whether the determined response time is within the acceptable receive window of time. If the determined response time is within the acceptable receive window of time, at 1218, the received response may be recognized or confirmed as a legitimate message from the legitimate second device. If the determined response time is not within the acceptable receive window of time, at 1220, the communications device is to proceed with one or more precautionary measures in light of the suspicious received response. Precautionary measures may include, for example, sending a request for further device authentication, re-sending original message, sending an error message, etc. In some embodiments, a precautionary measure may include not proceeding at all (no further action).

The example process 1200 may be used by any sending device to determine if its message was received by a legitimate second device. Using the same technique, a receiving device may check to see if an initially received message was in fact from a legitimate sending device by sending a test message to the sending device and requesting a response. If an expected response is received, and is received in the expected time window, the receiving device may recognize or confirm the initially received message as coming from a legitimate sending device. If an expected response is not received, or if a response is received outside of the expected time window, the receiving device is to proceed with one or more precautionary measures (examples noted above) due to suspicion that the sending device is not a legitimate sending device (and may be a malicious device trying to gain unauthorized access).

Figure 13:
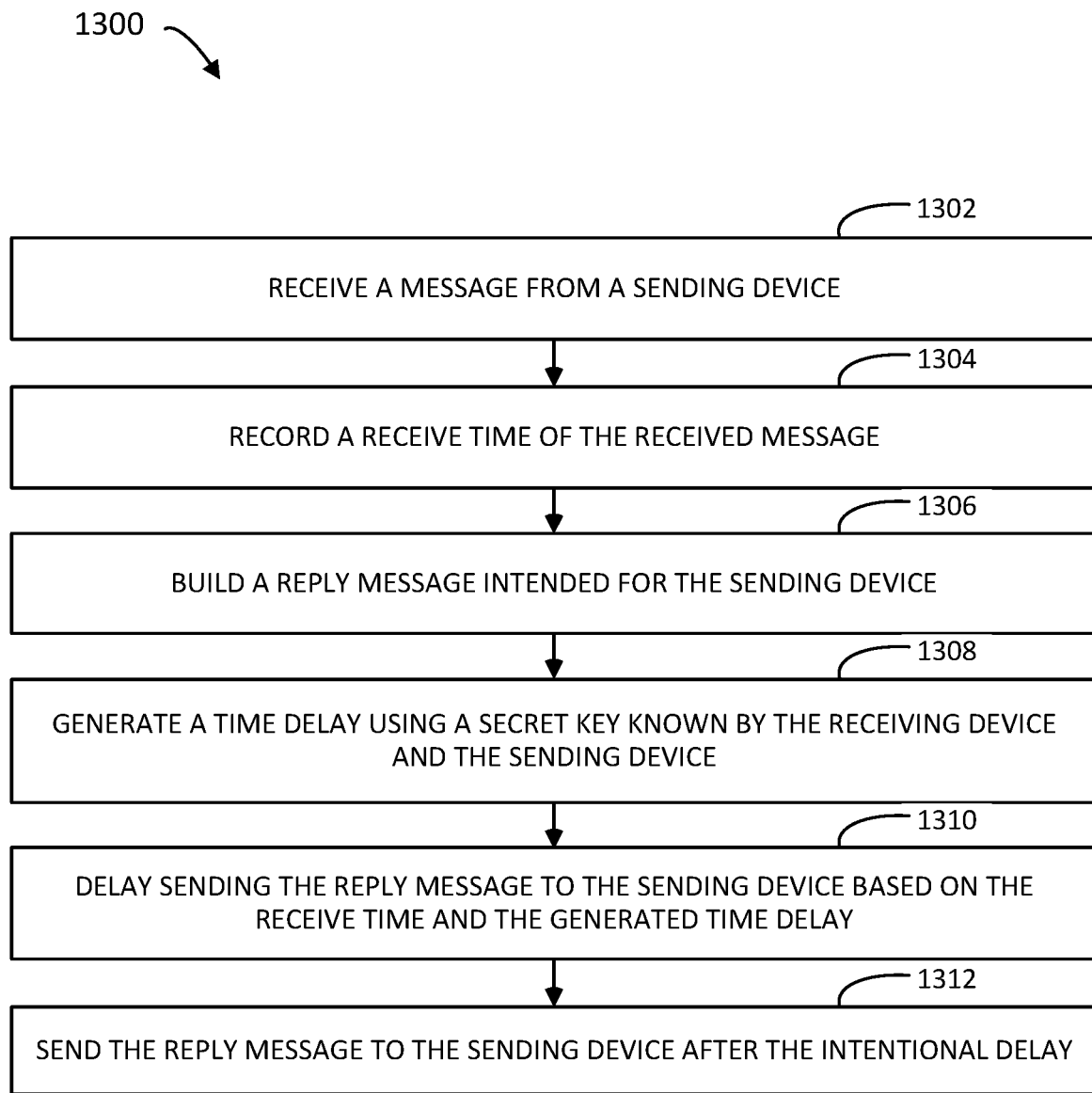
FIG. 13 is a flow diagram illustrating an example of defending against a MITM occurrence from the perspective of a receiving device, according to an embodiment of the present disclosure.

FIG. 13 illustrates an example 1300 of defending against a MITME occurrence from the perspective of a receiving device, according to an embodiment of the present disclosure. At 1302, a message from a sending device may be received at the receiving device. In the context of the present disclosure, the sending device and the receiving device may be a validation device and accessor device, or an accessor device and operable device, or an access granting device and validation device, for example. At 1304, a receive time of the received message may be recorded by the receiving device. At 1306, a reply message intended for the sending device may be built by the receiving device. At 1308, a time delay may be generated by the receiving device using a secret key known by the receiving device and the sending device. In an embodiment, the secret key may be provided to the receiving device in the received message (e.g., an encrypted key). In an alternative embodiment, the secret key may have been previously provided to the receiving device (e.g., pre-recorded at the receiving device (e.g., during manufacturing, configuration, etc.), in a previous message from a trusted device, etc.). The time delay may take into account such information as, for example, message processing time, anticipated network latency, etc. At 1310, the receiving device may delay sending the reply message to the sending device based on the receive time and the generated time delay. At 1312, the receiving device may send the reply message to the sending device after the intentional delay.

Example Environment(s)/Device(s)

Figure 14:
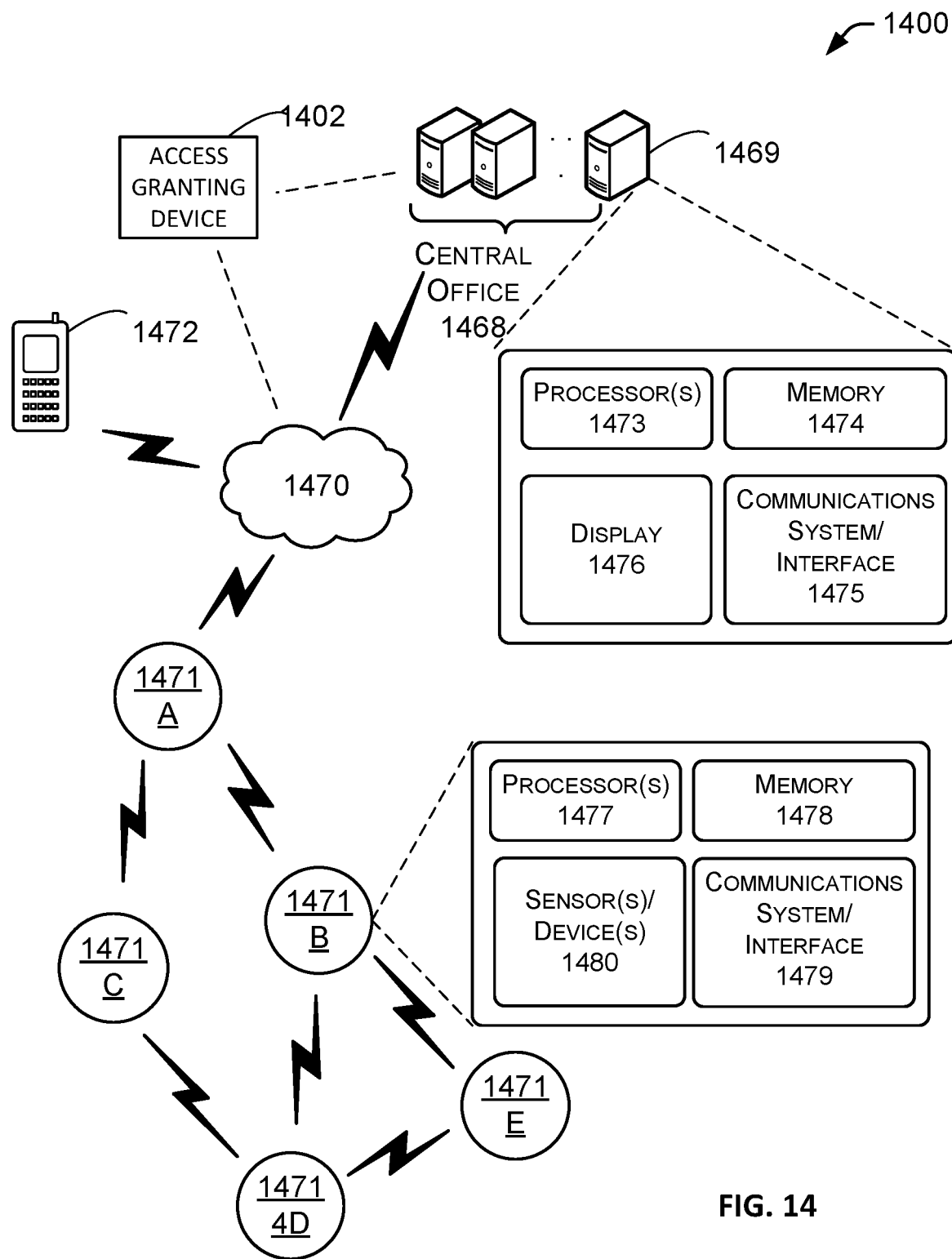
FIG. 14 is an illustration of an example network environment in which example methods, apparatus, and articles of manufacture disclosed herein may be implemented, according to embodiments of the present disclosure.

FIG. 14 is an illustration of an example network environment in which methods, apparatus, and articles of manufacture disclosed herein may be implemented, according to embodiments of the present disclosure. For example, a validation device 104/304/704/904 may be a part (e.g., a network node) of an advanced communication system (e.g., a telecommunication system, an advanced meter reading (AMR) network or an advanced metering infrastructure (AMI) network, an Internet of Things (IoT)-based network, etc.), such as data collection network 1400 of FIG. 14, according to embodiments. Data collection network 1400 may include a central office 1468, which may be associated with a data collection/processing entity (e.g., a utility company, in the case of an AMR or AMI network). The central office may include one or more central computing (or head-end) device(s) 1469 that may communicate with network nodes through one or more networks 1470, which may be the Internet or other network having widespread or local functionality. Network nodes may include nodes 1471A-1471E (collectively, nodes 1471), which may include, for example, endpoint devices such as utility meters (e.g., gas meters, water meters, electric meters, etc.), other devices related to a utility network (e.g., relays, repeaters, routers, transformers, or any such utility network computing device), or other communication devices, including those that may comprise or be associated with sensors, actuators, etc. These nodes may be located at various locations (e.g., homes, businesses, etc.). Nodes 1471A-1471E may be configured in a mesh network, star network or other configuration. While only five nodes 1471 are illustrated for simplicity, there may be any number of network nodes. One or more of the network nodes (e.g., device 1471A) may be a data collector and/or concentrator that may be configured for communication (e.g., radio frequency (RF) communication, cellular communication, etc.) with a plurality of downstream nodes 1471B-1471E, which may also be configured for similar communications. In an example operation, data collector 1471A may send and/or receive data or other communications to and/or from nodes 1471B-1471E to be provided to a data collection (or head-end) device 1469 (which may be located at central office 1468), and/or a mobile data collection (or head-end) device 1472. For example, in an AMR or AMI network, data collector 1471A may collect data from nodes 1471B-1471E that may include consumption data or other information associated with a utility meter (e.g., a gas meter, a water meter, an electricity meter, etc.) or other device. Additionally, data collector 1471A may send software updates, firmware updates, configuration updates, instructions or other information (which may have been communicated to data collector 1471A from data collection device 1469 or 1472, for example) to one or more of the nodes 1471B-1471E. In an embodiment, one or more network nodes (e.g., nodes 1471A-1471E) may be powered by a battery.

In an expanded view, data collection device 1469 (and/or mobile data collection device 1472) may include, among other components, one or more controllers or processors 1473, a memory 1474, one or more communication systems and/or interfaces 1475 (e.g., configured for RF communications, cellular communications, and/or another type of communications), and optionally a display 1476. Nodes 1471 may include, among other components, one or more controllers or processors 1477, a memory 1478, one or more communication systems and/or interfaces 1479 (e.g., configured for RF communications, cellular communications, and/or another type of communications), and one or more sensors/devices 1480, which may include, for example, one or more measurement sensors or other devices (e.g., meter(s), actuator(s), light(s), etc.). Data collection device 1469 (and/or mobile data collection device 1472) may be a head-end device (e.g., a computing device from a central office).

One or more features disclosed herein may be implemented in hardware, software, firmware, and/or combinations thereof, including discrete and integrated circuit logic, application specific integrated circuit (ASIC) logic, field-programmable gate array (FPGA) logic, programmable logic controller (PLC) logic, and microcontrollers, and may be implemented as part of a domain-specific integrated circuit package, or a combination of integrated circuit packages. The terms software and firmware, as may be used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, over an electromagnetic wave guide, over a fiber optic cable, through a local or wide area network, through a personal area network (PAN), through a field area network (FAN), or through a network such as the Internet. An example of a non-transitory computer readable medium may be a compact disk, a flash memory, SRAM, DRAM, a hard drive, a solid state drive, or other data storage device.

A processing platform of a data collection device (e.g., data collection device 1469 or mobile data collection device 1472 of FIG. 14), and/or a node (e.g., any of devices 1471) may be embodied in any type of mobile and/or non-mobile computing device. Examples of mobile devices may include, but are not to be limited to, laptop computers, ultra-laptop computers, tablets, touch pads, portable computers, hand-held computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices (e.g., utility meters or other sensors or devices), etc.

Figure 15:
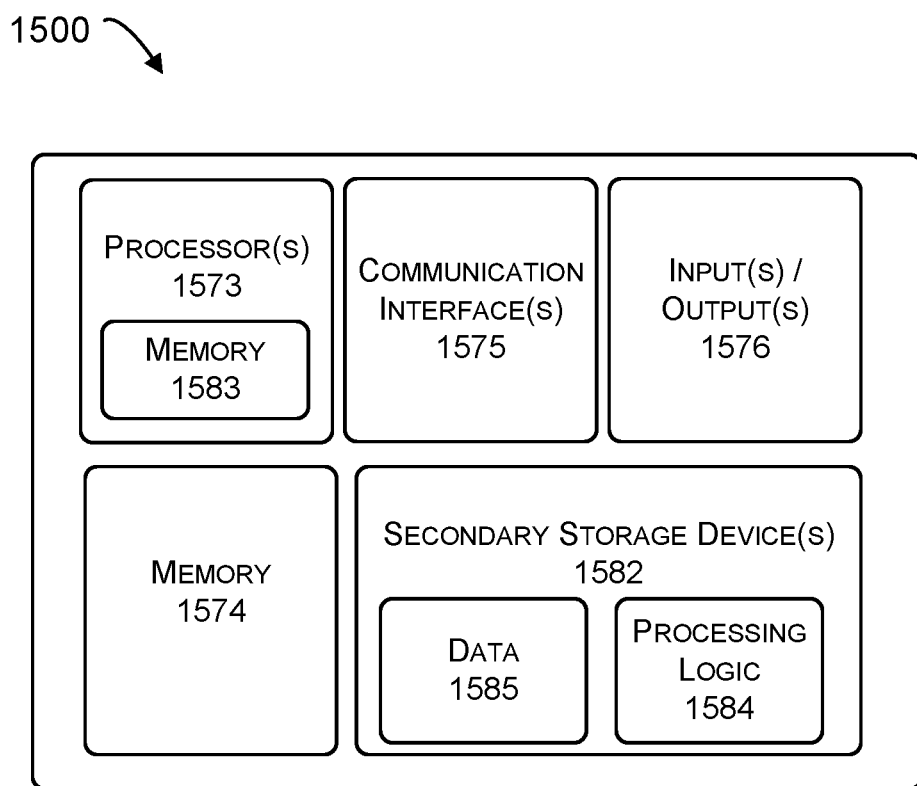
FIG. 15 is a block diagram showing various components of an example data collection device (e.g., device 1469 or device 1472 of FIG. 14), according to an embodiment of the present disclosure.

FIG. 15 is a block diagram of an example processing platform 1500 of a mobile or non-mobile data collection device (e.g., device(s) 1469, 1472), or user device, according to embodiments. A data collection device may act as a head-end device (e.g., a computing device from a central office (1468)) in the context of this disclosure (e.g., access granting device 102/302). A user device may include accessor device 106/306 in the context of this disclosure. Processing platform 1500 may include one or more processors 1573, memory 1574, one or more secondary storage devices 1582, one or more input/output ports or devices 1576, and/or one or more communication interfaces 1575, in communication via a bus, line, or similar implementation (not shown). Processing platform 1500 may also include a power supply (not shown), which may include an interface to an electricity source and/or may include one or more batteries.

Processor(s) 1573 may be implemented by, for example but not limitation, one or more integrated circuits, one or more ASIC, FPGA, PLC, or programmable logic device (PLD) circuits, logic circuits, microprocessors, controllers, etc. Processor(s) 1573 may include a local memory 1583 (e.g., a cache), an arithmetic logic unit (ALU), an internal or external bus controller, an internal register file, a floating point unit, a digital signal processer (DSP), an interrupt controller, and/or a memory management unit (MMU). Memory 1574 may include a volatile and/or a non-volatile memory. Volatile memory may be implemented by, for example but not limitation, Static RAM (SRAM), Dynamic RAMs (DRAMS) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1574 may be controlled by a memory controller (not shown). Data stored in memory 1574 and/or local memory 1583 may be used by processor(s) 1573 to facilitate data collection functions and/or communications, calculations/computations/determinations (e.g., if not done at the node device(s) or elsewhere), etc., according to embodiments of this disclosure.

Input/output port(s)/device(s) 1576 may allow a user or an external device to interface with processor(s) 1573. Input devices may allow a user to enter data and/or commands for processor(s) 1573. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices such as display device 1476. Examples of other display devices may include a light emitting diode (LED), an organic light emitting diode (OLED), a liquid crystal display, a cathode ray tube display (CRT), a touchscreen, a tactile output device, a printer, speakers, etc. User interface screens may be displayed on a display device. The input/output port(s)/device(s) may be connected to processor(s) 1573, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1575 may be implemented in hardware or a combination of hardware and software, and may provide wired or wireless network interface(s) to one or more networks, such as network(s) 1470 of FIG. 14. Communication interface(s) 1575 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1470. In an embodiment, security mechanisms may be used to provide secure communications, as would be understood by one of ordinary skill in the art.

Secondary storage device(s) 1582 may store processing logic 1584 (e.g., software) to be executed by processor(s) 1573, and/or may store data 1585. Processing logic 1584 and data 1585 may be used by processor(s) 1573 to facilitate data collection functions and/or communications between devices, calculations/computations (e.g., if not done at the node device(s) or elsewhere), etc., according to embodiments of this disclosure. Processing logic 1584 may include instructions for executing the methodology described herein for data communications and processing, for example, which may also include data packet generation/processing, running applications (e.g., related to gaining access to operable device(s)), collecting and reconciling data points, updating one or more clocks, determining legitimacy of other communication devices and messages, etc. Processing logic may also include any applications (or agents or features), such as any described herein. Examples of secondary storage device(s) 1582 may include one or more hard drive disks, including but not limited to electro-mechanical hard drives and FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1582.

Figure 16:
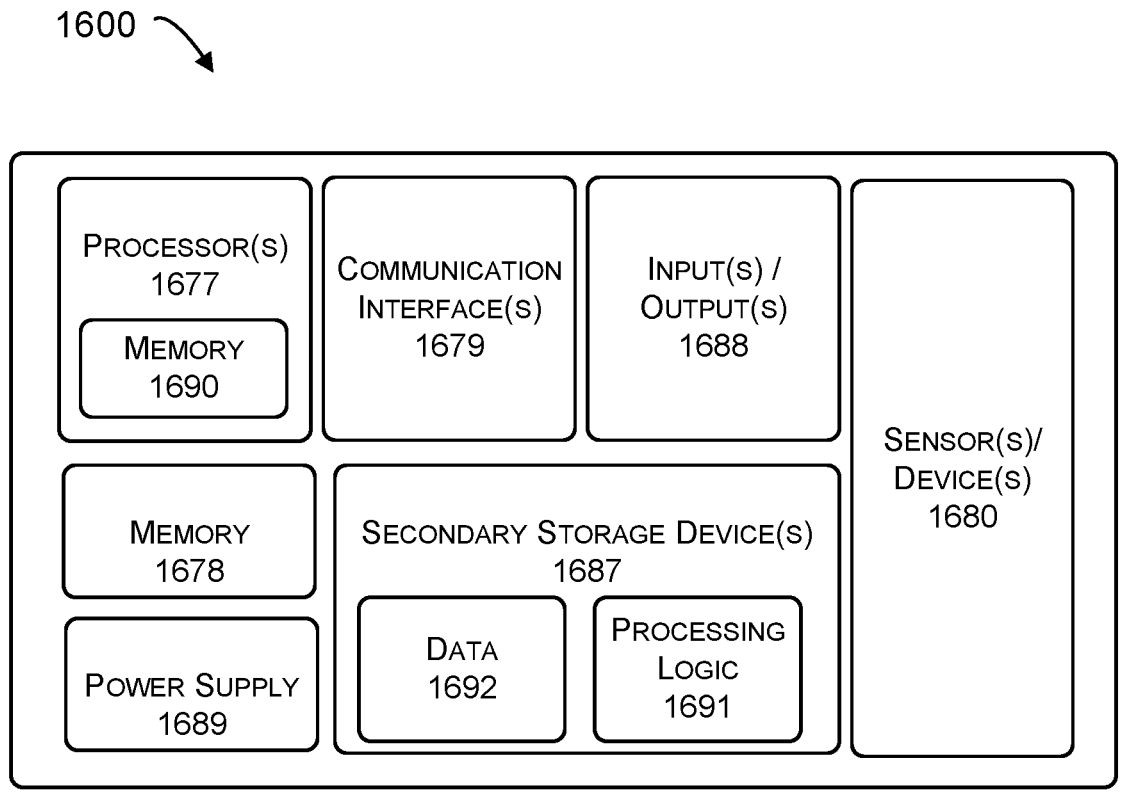
FIG. 16 is a block diagram showing various components of an example network node (e.g., one of devices 1471 of FIG. 14), according to an embodiment of the present disclosure.

FIG. 16 is a block diagram of an example processing platform 1600 of a node device (e.g., 1471), according to embodiments. A node device may be, for example, a validation device 104/304/704/904 in the context of this disclosure. Processing platform 1600 may include one or more processors 1677, memory 1678, one or more secondary storage devices 1687, one or more input/output ports or devices 1688, and/or one or more communication interfaces 1679, in communication via a bus, line, or similar implementation (not shown). Processing platform 1600 may also include a power supply 1689, which may include an interface to an electricity source and/or may include one or more batteries. Platform 1600 may also include one or more sensors/devices 1680, which may include, for example, one or more measurement sensors or other devices (e.g., meter(s), actuator(s), light(s), etc.).

Processor(s) 1677 may be implemented by, for example but not limitation, one or more integrated circuits, one or more ASIC, FPGA, PLC, or PLD circuits, logic circuits, microprocessors, controllers, etc. Processor(s) 1677 may include a local memory 1690 (e.g., a cache), an ALU, an internal or external bus controller, an internal register file, a floating point unit, a DSP, an interrupt controller, and/or a MMU. Memory 1678 may include a volatile and/or a non-volatile memory. Volatile memory may be implemented by, for example but not limitation, Static RAM (SRAM), Dynamic RAMs (DRAMS) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1678 may be controlled by a memory controller (not shown). Data stored in memory 1678 and/or local memory 1690 may be used by processor(s) 1677 to facilitate data collection functions, calculations/computations/determinations, metering functions and/or metering calculations/computations (if embodied in a utility meter), communications, etc.

Input/output port(s)/device(s) 1688 may allow a user or an external device to interface with processor(s) 1677. Input devices may allow a user to enter data and/or commands for processor(s) 1677. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output port(s)/device(s) 1688 may be connected to processor(s) 1677, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1679 may be implemented in hardware or a combination of hardware and software, and may provide wired or wireless network interface(s) to one or more networks, such as network(s) 1470 of FIG. 14. Communication interface(s) 1679 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1470. In an embodiment, security mechanisms may be used to provide secure communications, as would be understood by one of ordinary skill in the art.

Secondary storage device(s) 1687 may store processing logic 1691 (e.g., software) to be executed by processor(s) 1677, and/or may store data 1692. Processing logic 1691 and data 1692 may be used by processor(s) 1677 to facilitate sensor data collection functions, metering functions and/or metering calculations/computations if embodied in a utility meter, and/or communications between devices, etc., according to embodiments of this disclosure. Processing logic 1691 may include instructions for executing the methodology described herein, which may also include data packet generation, access validations, collecting and reconciling data points, updating one or more clocks, determining legitimacy of other communication devices and messages, etc., according to embodiments of this disclosure. Processing logic may also include any applications (or agents or features), such as any described herein. Examples of secondary storage device(s) 1687 may include one or more hard drive disks, including but not limited to electro-mechanical hard drives and FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1687.

The foregoing description discloses techniques and solutions that may be used to locally authenticate a communications device while saving time and resources and while also minimizing potential security issues. These solutions include one or more locally situated networked devices, which may be part of their own networked infrastructure, that become trusted validation devices for authentication of other devices that wish to access, for example, an operable device that is located in proximity of the trusted devices. A validation device may become "trusted" by an operable device based on the validation device's relationship with an access granting device. The local authentication allows for added security in that it can verify that a device requesting access is locally present and not attempting access from a remote location. This local authentication can be enhanced via trust aggregation of data points, which can include authentication data, time data, etc., as well as time synchronization. While a man-in-the-middle (MITM) attack is a possibility in the examples presented herein (and in any communications between devices), ways to thwart those attacks are also presented.

The particular examples used in this document are for ease of understanding and are not to be limiting. The description herein is, at times, directed to use of utility meters (e.g., gas meters, water meters, electricity meters, etc.) as validation devices. An implementation using utility meters may be beneficial because metering systems may run on their own private networks, providing trusted devices along with additional security measures (e.g., tamper-resistance, etc.). However, systems and techniques described herein may be used in many other contexts (e.g., private network authentication, employee entrance authorization (e.g., badge reading), local payment validation (e.g., credit card, device-based payments, etc.), ankle bracelet monitoring, barcode scanning, RFID scanning, etc.) that may or may not involve utility meters as validation devices (perhaps other local networked devices may be used, for example streetlight controllers, supervisory control and data acquisition (SCADA) controllers, etc.) and may involve various types of networks and systems (e.g., various network communication systems, IoT networks, WSN networks, etc.). As would be understood by one of ordinary skill in the art, the features discussed herein may be beneficial in any networked communication system, including many other systems and technology spaces that may involve communications between devices and applications that may require local validation, including in fields yet unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A utility meter comprising:
   a processor;
   a transceiver communicably coupled with the processor, the transceiver configured to communicate over a network; and
   a memory communicably coupled with the processor, the memory storing instructions that, when executed by the processor, direct the processor to:
      build a message, as a built message, intended for a mobile device associated with a user, the built message including a copy of a secret key known by the utility meter and the mobile device associated with the user, wherein the utility meter comprises a relay device;
      generate a time delay using the secret key known by the utility meter and the mobile device associated with the user;
      send, via the transceiver, the built message to the mobile device associated with the user;
      start a time counter at a zero time of sending the built message;
      receive a response to the built message;
      determine a response time of the response based on a time value of the time counter;
      determine an acceptable receive window of time based on the time delay;
      determine whether the response time is within the acceptable receive window of time; and
      in response to the response time being outside the acceptable receive window of time, proceeding with one or more precautionary measures, the one or more precautionary measures including at least re-sending the built message.

2. The utility meter of claim 1, wherein the secret key is provided to the utility meter prior to building the message intended for the mobile device associated with the user.

3. The utility meter of claim 1, wherein the secret key is provided to the utility meter in a message previously received from the mobile device associated with the user.

4. The utility meter of claim 1, wherein the time delay takes into account message processing time at the mobile device associated with the user.

5. The utility meter of claim 1, wherein the time delay takes into account expected network latency.

6. The utility meter of claim 1, wherein the copy of the secret key comprises an encrypted copy of the secret key.

7. A method comprising:
   building, via a processor of a utility meter, a built message intended for a mobile device associated with a user, the built message including a copy of a secret key known by the utility meter and the mobile device associated with the user;
   generating, via the processor, a time delay using the secret key known to the utility meter and to the mobile device associated with the user;
   sending, via a transceiver of the utility meter over a network, the built message to the mobile device associated with the user;
   starting a timer of the utility meter at a time of sending the built message;
   receiving, via the transceiver, a response to the built message;
   determining a response time of the response based on a time value of the timer;
   determining an acceptable receive window of time based on the time delay;
   determining that the response time is outside the acceptable receive window of time; and
   proceeding with one or more precautionary measures in response to the response time being outside the acceptable receive window of time, the one or more precautionary measures including at least re-sending the built message.

8. The method of claim 7, wherein the generating the time delay includes generating the time delay to take into account message processing time at the mobile device associated with the user.

9. The method of claim 7, wherein the generating the time delay includes generating the time delay to take into account expected network latency.

10. The method of claim 7, wherein the copy of the secret key comprises an encrypted copy of the secret key.

11. At least one non-transitory computer-readable medium having computer program logic stored thereon, the computer program logic including instructions that, when executed by a processor of a utility meter, cause the processor to:
   build a built message intended for a mobile device associated with a user, the built message including a copy of a secret key known by the utility meter and the mobile device associated with the user, wherein the utility meter comprises a relay device;
   generate a time delay using the secret key known to the utility meter and to the mobile device associated with the user;
   send, via a transceiver of the utility meter over a network, the built message to the mobile device associated with the user;
   start a time counter of the utility meter at a zero time of sending the built message;
   receive, via the transceiver, a response to the built message;
   determine a response time of the response based on a time value of the time counter;
   determine an acceptable receive window of time based on the time delay;
   determine whether the response time is within the acceptable receive window of time; and
   in response to the response time being outside the acceptable receive window of time, proceeding with one or more precautionary measures, the one or more precautionary measures including at least re-sending the built message.

12. The at least one non-transitory computer-readable medium of claim 11, wherein generating the time delay includes generating the time delay to take into account message processing time at the mobile device associated with the user.

13. The at least one non-transitory computer-readable medium of claim 11, wherein generating the time delay includes generating the time delay to take into account expected network latency.

14. The at least one non-transitory computer-readable medium of claim 11, wherein the copy of the secret key comprises an encrypted copy of the secret key.

15. A mobile device comprising:
- a processor;
- a transceiver communicably coupled with the processor; and
- a memory communicably coupled with the processor, the memory storing instructions that, when executed by the processor, direct the processor to:
  - receive a message from a utility meter over a network, the utility meter comprising a relay device;
  - record, in the memory, a receive time of the message;
  - build a reply message intended for the utility meter, the reply message including a copy of a secret key known by the mobile device and the utility meter;
  - generate a time delay using a time counter started at a zero time of receiving the message, the time delay being based at least in part on the secret key known by the mobile device and the utility meter;
  - intentionally delay sending the reply message to the utility meter based on the receive time and the time delay; and
  - send, via the transceiver, the reply message to the utility meter after the intentional delay.

16. The mobile device of claim 15, wherein the copy of the secret key comprises an encrypted copy of the secret key.

17. The mobile device of claim 15, wherein the time delay takes into account message processing time at the utility meter.

18. The mobile device of claim 15, wherein the time delay takes into account expected network latency.

19. The utility meter of claim 1, wherein the relay device includes a signed root certificate.

20. The method of claim 7, wherein proceeding with the one or more precautionary measures includes sending a request for further device authentication.

21. The method of claim 7, wherein proceeding with the one or more precautionary measures includes sending an error message.

* * * * *